(12) United States Patent
Svrcek et al.

(10) Patent No.: US 11,746,904 B2
(45) Date of Patent: *Sep. 5, 2023

(54) REINFORCED SEALING RINGS

(71) Applicant: Mainspring Energy, Inc., Menlo Park, CA (US)

(72) Inventors: Matt Svrcek, Redwood City, CA (US); Jodie Prudhomme, San Francisco, CA (US); Jerry DeJong, Union City, CA (US); Tom Hasler, Woodside, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,886

(22) Filed: Nov. 17, 2021

(65) Prior Publication Data
US 2022/0074493 A1    Mar. 10, 2022

Related U.S. Application Data

(63) Continuation of application No. 16/945,580, filed on Jul. 31, 2020, now Pat. No. 11,193,588, which is a
(Continued)

(51) Int. Cl.
*F16J 9/28* (2006.01)
*F16J 9/16* (2006.01)
(Continued)

(52) U.S. Cl.
CPC .............. *F16J 9/28* (2013.01); *F02G 1/0535* (2013.01); *F16J 9/16* (2013.01); *F16J 15/164* (2013.01);
(Continued)

(58) Field of Classification Search
CPC ... F02G 2253/02; F02G 1/0535; F16J 15/442; F16J 15/34; F16J 15/164; F16J 9/16; F16J 9/28
See application file for complete search history.

(56) References Cited

U.S. PATENT DOCUMENTS

| 1,525,428 A | 2/1925 | Pally |
| 1,854,708 A | 4/1932 | Mastin |

(Continued)

FOREIGN PATENT DOCUMENTS

| DE | 2404228 | 8/1975 |
| DE | 102012019166 | 4/2014 |

(Continued)

OTHER PUBLICATIONS

PCT International Search Report and Written Opinion of the International Searching Authority for International Application No. PCT/US2018/046105, dated Nov. 7, 2018 (13 pages).

(Continued)

*Primary Examiner* — Eugene G Byrd
(74) *Attorney, Agent, or Firm* — HALEY GUILIANO LLP

(57) ABSTRACT

The present disclosure provides a sealing ring assembly having a sealing ring and a reinforcement, configured to seal a high-pressure region from a lower pressure region of a piston and cylinder device. The sealing ring may be segmented, and a metal layer, wire, or other reinforcement may be affixed to the ring. The reinforcement is placed into tension against the sealing ring, which is correspondingly placed into compression. The composite structure of a relatively brittle sealing ring and reinforcement provides for reduced tensile loads in the sealing ring, thus extending life and reducing the likelihood of failure. The brittle portion of the sealing ring assembly may include a polymer or ceramic such as graphite, which is relatively less strong in tension than compression.

31 Claims, 17 Drawing Sheets

Related U.S. Application Data continuation-in-part of application No. 16/059,933, filed on Aug. 9, 2018, now Pat. No. 10,731,759.

(60) Provisional application No. 62/543,282, filed on Aug. 9, 2017, provisional application No. 62/543,285, filed on Aug. 9, 2017.

(51) Int. Cl.
| | |
|---|---|
| *F16J 15/44* | (2006.01) |
| *F16J 15/16* | (2006.01) |
| *F02G 1/053* | (2006.01) |
| *F16J 15/34* | (2006.01) |

(52) U.S. Cl.
CPC ............ *F16J 15/34* (2013.01); *F16J 15/442* (2013.01); *F02G 2253/02* (2013.01)

(56) References Cited

U.S. PATENT DOCUMENTS

| | | | |
|---|---|---|---|
| RE20,256 E | 1/1937 | Wuerfel | |
| 2,153,025 A * | 4/1939 | Rais | F16J 9/28 277/469 |
| 2,293,450 A | 8/1942 | Wilkening | |
| 2,468,980 A | 5/1949 | Huber | |
| 2,779,646 A * | 1/1957 | Creed | F16J 9/28 92/252 |
| 2,823,086 A | 2/1958 | Zahodiakin | |
| 2,898,134 A * | 8/1959 | Moskow | F16J 15/32 277/467 |
| 2,925,306 A | 2/1960 | Esper | |
| 3,099,455 A * | 7/1963 | Mayfield | F16J 9/063 277/481 |
| 3,149,543 A | 9/1964 | Naab | |
| 3,455,565 A | 7/1969 | Jepsen | |
| 3,528,667 A | 9/1970 | Spaven | |
| 3,612,538 A | 10/1971 | Sievenpiper | |
| 3,612,545 A * | 10/1971 | Storms | F16J 15/32 277/937 |
| 3,655,208 A * | 4/1972 | Walker | F16J 9/28 277/497 |
| 3,658,350 A | 4/1972 | Ondraka | |
| 3,735,992 A | 5/1973 | Prostorov | |
| 3,770,285 A | 11/1973 | Grover | |
| 4,185,842 A | 1/1980 | Magara | |
| 4,455,974 A | 6/1984 | Shapiro | |
| 4,516,481 A | 5/1985 | Geffroy | |
| 5,014,999 A * | 5/1991 | Makhobey | F16J 15/441 277/422 |
| 6,322,080 B1 | 11/2001 | Feistel | |
| 6,378,872 B1 * | 4/2002 | Moriarty | F16J 9/16 277/435 |
| 6,457,722 B1 | 10/2002 | Feistel | |
| 7,634,963 B2 | 12/2009 | Maier | |
| 8,177,237 B2 * | 5/2012 | Lindner-Silwester | F16J 9/18 277/435 |
| 8,807,571 B2 * | 8/2014 | Chalk | F16J 9/12 277/494 |
| 10,731,759 B2 | 8/2020 | Svrcek | |
| 11,193,588 B2 | 12/2021 | Svrcek et al. | |
| 2003/0006562 A1 | 1/2003 | Feistel | |
| 2007/0125323 A1 * | 6/2007 | Hofbauer | F16J 9/02 123/193.4 |
| 2015/0292622 A1 | 10/2015 | Kennedy | |
| 2019/0049012 A1 * | 2/2019 | Svrcek | F16J 9/16 |
| 2020/0362966 A1 * | 11/2020 | Svrcek | F16J 9/26 |
| 2021/0388114 A1 | 12/2021 | Thorn et al. | |

FOREIGN PATENT DOCUMENTS

| | | |
|---|---|---|
| JP | 55006067 | 1/1980 |
| JP | 59-083869 A | 5/1984 |
| JP | 61-114158 U | 7/1986 |
| JP | 1991024940 Y2 | 5/1991 |
| JP | 04095665 | 3/1992 |
| JP | 08-200510 A | 8/1996 |
| JP | 2001-289328 A | 10/2001 |
| JP | 2014070737 | 4/2014 |
| JP | 2020530544 | 10/2020 |
| WO | WO2009065205 | 5/2009 |
| WO | 2019/032895 A1 | 2/2019 |

OTHER PUBLICATIONS

EPO Office Action for Application No. 18760151.3 dated Nov. 30, 2020.

\* cited by examiner

REINFORCED SEALING RINGS

CROSS-REFERENCE TO RELATED APPLICATION

The present disclosure is directed towards a piston sealing ring assembly and, more particularly, the present disclosure is directed towards a piston sealing ring assembly that includes a sealing ring with reinforcement. This application is a continuation of U.S. patent application Ser. No. 16/945,580 filed Jul. 31, 2020, which is a continuation-in-part of U.S. patent application Ser. No. 16/059,933 filed on Aug. 9, 2018, which claims the benefit of U.S. Provisional Patent Application Nos. 62/543,282 and 62/543,285 both filed Aug. 9, 2017, the disclosures of which are hereby incorporated by reference herein in their entireties.

BACKGROUND

Typically, piston-cylinder devices employ metal rings with oil lubrication to provide a seal. In the absence of lubricating oil, a piston seal can be constructed from a self-lubricating material such as a polymer or ceramic (e.g., graphite). Use of a self-lubricating material for the seal eliminates scuffing or galling caused by an unlubricated metal ring but can result in a relatively high wear rate as compared to a conventional oil-lubricated seal arrangement.

For economic reasons, it is desirable for the seal to function for as long as possible before needing replacement. For example, a typical target might be hundreds or thousands of hours of operation. Throughout this lifetime, the seal wears down radially. To compensate for this wear, the seal is typically split in one or more places, allowing pressure to expand the ring outward and maintain sealing contact with the cylinder wall in spite of the material removed via wear.

As the seal wears, it stretches to conform to the cylinder during, for example, a piston stroke. This stretch results in increasing levels of tensile stress in the seal, with the highest stretch-induced tensile stresses typically arising at the radially inner surface (e.g., defining an inner diameter (ID)) of the ring or ring segment. For materials that are weak in tension (i.e., brittle), this can be a life-limiting phenomenon wherein the seal is capable of only a finite amount of stretch and, in turn, a finite amount of radial wear) before tensile stresses cause it to fracture.

SUMMARY

In some embodiments, a sealing ring assembly includes at least one ring segment, and at least one reinforcement affixed to the at least one ceramic ring segment at an interface. The reinforcement provides a compressive preload onto the at least one ring segment.

In some embodiments, the interface is a brazed joint. In some embodiments, the reinforcement includes a metal layer, which includes at least one metal sheet.

In some embodiments, at least one ring segment includes a ceramic or a polymer. In some embodiments, at least one of the at least one ring segment includes a self-lubricating material. For example, in some embodiments, the self-lubricating material includes graphite.

In some embodiments, the at least one ring segment has a corresponding first coefficient of thermal expansion (CTE), the reinforcement has a corresponding second CTE, and the first CTE and the second CTE are matched to each other. For example, in some embodiments, the first CTE and the second CTE are substantially similar. In some embodiments, for example, the first CTE and second CTE need not be matched.

In some embodiments, the reinforcement is affixed along a portion of the at least one ceramic ring segment. In some embodiments, the reinforcement is affixed along an inner radial surface of the at least one ring segment.

In some embodiments, as the at least one ring segment wears, the at least one ring segment remains in compression, and the at least one reinforcement remains in tension, for at least some time during operation. For example, in some embodiments, during high-pressure periods of a stroke or cycle of a piston and cylinder device, the at least one ring segment remains in compression, and the at least one reinforcement remains in tension.

In some embodiments, the present disclosure is directed to a device that includes a cylinder, a piston, and a sealing ring assembly. The cylinder includes a bore, and the bore, in turn, includes a low-pressure region and a high-pressure region. The piston comprises a ring groove, and the piston is configured to translate along an axis of the bore. The sealing ring assembly is arranged in the ring groove. The sealing ring assembly includes at least one ring segment configured to seal between the low-pressure region and the high-pressure region, and at least one reinforcement affixed to the at least one ring segment at an interface. The reinforcement provides a compressive preload onto the at least one ring segment, for at least some of a stroke. In some embodiments, the sealing ring assembly is configured for oil-less operation in the bore.

In some embodiments, the present disclosure is directed to a sealing ring assembly that includes at least one ring segment, and at least one wire engaged with the at least one ring segment causing the at least one ring segment to be in compression and the at least one wire to be in tension, for at least some of the stroke (e.g., at least some of every stroke).

In some embodiments, the wire comprises metal.

In some embodiments, the at least one wire is engaged to the at least one ring segment at an interface. In some embodiments, the at least one wire is engaged to the at least one ring segment using a tensioning termination. In some embodiments, the at least one wire azimuthally extends through the at least one ring segment.

In some embodiments, the at least one wire includes at least one threaded end, the tensioning termination includes a thread corresponding to the threaded end, and the tensioning termination is threaded onto the threaded end to cause the engaging. In some embodiments, the tensioning termination is torqued onto the threaded end.

In some embodiments, the present disclosure is directed to a device that includes a cylinder, a piston, and a sealing ring assembly. The cylinder includes a bore, and the bore, in turn, includes a low-pressure region and a high-pressure region. The piston includes a ring groove, and the piston is configured to translate along an axis of the bore. The sealing ring assembly is arranged in the ring groove. The sealing ring assembly includes at least one ring segment configured to seal between the low-pressure region and the high-pressure region, and at least one wire engaged with the at least one ring segment causing the at least one ring segment to be in compression and the at least one wire to be in tension. In some embodiments, the sealing ring assembly is configured for oil-less operation in the bore. In some embodiments, for example, the at least one wire includes a metal or a carbon fiber.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration, these drawings are not necessarily made to scale.

DETAILED DESCRIPTION

Figure 1:
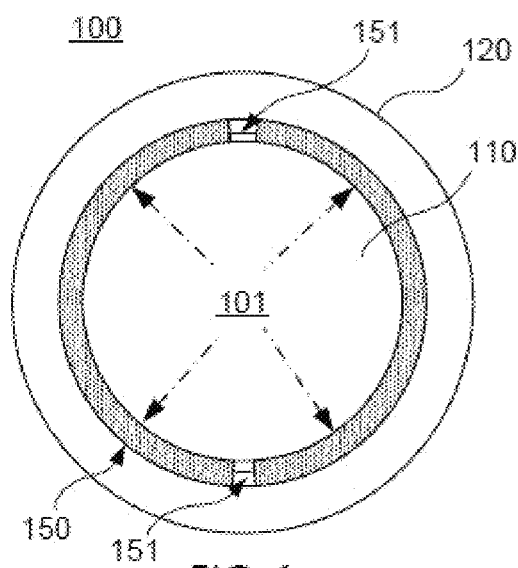
FIG. 1 shows a cross-sectional axial view of a portion of an illustrative piston and cylinder assembly, with a non-worn sealing ring assembly, in accordance with some embodiments of the present disclosure.

In accordance with the present disclosure, a sealing ring assembly may include a composite structure. The composite structure may include at least two materials, the first of which may include a material with a relatively low strength (e.g., a polymer) or a relatively low toughness (e.g., some ceramics), or both (e.g. graphite), and the second of which has relatively higher tensile strength, toughness, or modulus of elasticity (Young's modulus) (e.g., a metal, metal alloy, metallic solid, carbon fiber reinforced polymer, ceramic, composite, or other material). In some embodiments, the lower strength material may be brittle, that is, generally stronger in compression than in tension or otherwise having a lower toughness as measured by, for example, the Charpy or Izod notched impact strength tests. In such embodiments, the two materials may be engaged at an interface to cause the brittle material to be in compression and the second material to be in tension. Accordingly, the composite structure may be relatively more resilient than the brittle material alone when used as a seal subjected to the environment in a bore of a piston-cylinder device. It will be understood that a "brittle material" or a "relatively brittle material," as used herein, refers to a material that is weak in tension (e.g., as compared to a reinforcement material), but stronger in compression, or that has a low toughness. Accordingly, materials such as ceramics (e.g., graphite) and some polymers, for example, may be referred to herein as brittle materials in the context of sealing ring assemblies. Brittle materials may also include composite structures that are relatively brittle, even if they include minor constituents that are not themselves brittle (e.g., metal additives or other materials). Further, materials used for reinforcement may include materials having a higher relative strength in tension or a higher modulus of elasticity (or both) such as, for example, metals, such as steel or molybdenum, or alloys thereof, other metal alloys, or a ceramic material. In some embodiments, the reinforcement may be made of a composite material such as a ceramic matrix composite (CMC), a fiber-reinforced plastic such as a carbon fiber reinforced polymer (CFRP), or a combination thereof. A reinforcement may include a material that would otherwise be brittle but is included in the structure that is effectively less brittle than a ring segment. For example, in some embodiments, the sealing ring may have a higher modulus of elasticity than the reinforcement, yet the sealing ring may be brittle, having a lower fracture toughness than the reinforcement. In such designs, for example, the resulting ring segment is effectively stronger than the sealing ring because the reinforcement can stop crack propagation in the sealing ring and keep the ring segment structurally intact.

A sealing ring may be made of a material having a modulus of elasticity of between about 4 GPa and 30 GPa, or between about 10 GPa to 20 GPa for graphite, for example. The compressive strength may be between about 30 MPa and 350 MPa, or between about 100 MPa and 130 GPa for graphite, for example. The tensile strength may be between about 5 MPa and 80 MPa, or between about 30 MPa and 50 MPa for graphite, for example.

A reinforcement may have a modulus of elasticity of between about 50 GPa and 350 GPa, or about 330 GPa, for example, for molybdenum (e.g., 99% pure). The tensile or compressive strength may be between about 70 MPa and 2100 MPa, or between about 300 MPa and 400 MPa for a tensile strength for molybdenum (e.g., 99% pure).

It will also be understood that "self-lubricating material," as used herein, refers to a material that deposits (e.g., via rubbing or attrition) onto a surface and acts as a solid lubricant to prevent galling or scuffing, or both, of components in relative motion. For example, graphite may be referred to herein as a self-lubricating material. Other materials suitable for oil-free operation include polytetrafluoroethylene (PTFE) and PTFE/silicone.

The term "seal" as used herein, refers to the creation, maintenance, or both, of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal or sealing ring assembly, as described herein, may have any suitable corresponding leakage rate. For example, in some circumstances, a relatively worse seal may allow more leakage but may be acceptable based on some performance criterion. In a further example, a sealing ring assembly having reinforcement and configured for high-efficiency operation of a piston and cylinder device may have a relatively low leakage rate (e.g., be a more effective seal). For example, leakage of less than 1% based on pressure (e.g., a leak-down test) may be acceptable in some high-performance applications, and leakage of 10% or even 20% or more may be within acceptable ranges for other applications.

In some embodiments, a sealing ring assembly may include at least one ring segment, which may include a relatively brittle material. In some embodiments, the second material may be a metal layer affixed to the ring segment. In some embodiments, the second material may be in the form of a wire engaged with the ring segment. In some embodiments, the second material may be a metal such as steel, nickel, or molybdenum affixed to the ring segment. In some embodiments, the reinforcement may be made of a ceramic, or a composite material such as a ceramic matrix composite (CMC), or a fiber-reinforced plastic such as s carbon fiber reinforced polymer (CFRP).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element, including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element may be considered to be a ring segment because, like a ring segment, a gap cover element is configured to bear against a cylinder wall or a piston and it may be made of the same or similar materials to a ring segment.

As used herein, a "sealing ring assembly" shall refer to an assembly of one or more rings, and sometimes also one or more gap cover elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

Figure 2:
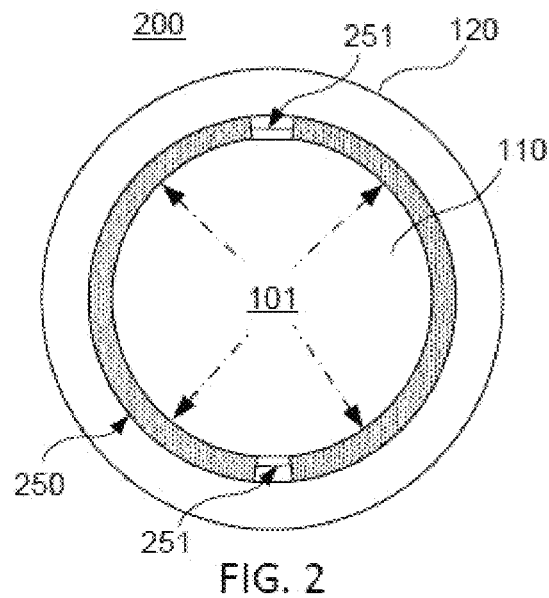
FIG. 2 shows a cross-sectional axial view of a portion of an illustrative piston and cylinder assembly, with a worn sealing ring assembly, in accordance with some embodiments of the present disclosure.

FIG. 1 shows a cross-sectional end view of a portion of an illustrative piston and cylinder assembly 100 (e.g., including piston 110 and cylinder 120), with non-worn sealing ring assembly 150, in accordance with some embodiments of the present disclosure. FIG. 2 shows a cross-sectional end view of a portion of illustrative piston and cylinder assembly 200 (e.g., including piston 110 and cylinder 120), with worn sealing ring assembly 250, in accordance with some embodiments of the present disclosure. As sealing ring assembly 150 of FIG. 1 undergoes wear, it may eventually resemble sealing ring assembly 250 of FIG. 2. For example, gaps 151 may widen to resemble gaps 251. Pressure (e.g., from a high-pressure region), shown by vectors 101, pushes sealing ring assembly 150 outward during operation, which may aid in sealing the piston-cylinder device. As a sealing ring assembly wears, gaps 251 may form between adjacent ring segments. Gaps 251, if not accounted for, lead to increased leakage and poorer performance of the piston-cylinder device.

Sealing rings may be reinforced by combining a material having a higher stiffness or strength (tensile, yield, or fracture toughness) than the sealing ring to reduce the stress in the sealing ring element. The resulting sealing ring assembly has a composite structure, and for a given load state, the stress in the sealing ring is reduced ("stress shielded") because some of the load is carried by the reinforcement; as a result, the sealing ring experiences lower stress. In an illustrative example, the cross-sectional size of the reinforcement portion may be much smaller than the cross-sectional area of the seal portion, but as long as the interface between the two materials remains connected (e.g., the reinforcement remains affixed to the seal) then the stress in the seal will be reduced.

One manner in which a reinforcement strengthens an assembly is by reducing the stress in the structural element being reinforced. In some embodiments, the reinforcement may be stiffer and may carry more load, resulting in high stresses in the reinforcement because the stress developed in a material is proportional to stiffness (modulus) of the material. Therefore, in addition to having a relatively high modulus of elasticity in comparison to the structural element being supported, the reinforcement may require a suitably high strength governed by material properties such as yield stress, ultimate strength, or ultimate tensile strength or any other relevant strength metric appropriate to the load case, failure mode, and material.

The reduction in stress created by a reinforcement may be more pronounced in beam-like structures, especially if the reinforcement is applied at an outer fiber of the beam. For example, piston rings are typically subject to bending stresses due to pressure from a high-pressure region pushing the sealing ring radially outward, as illustrated in FIG. 2.

Figure 3A:
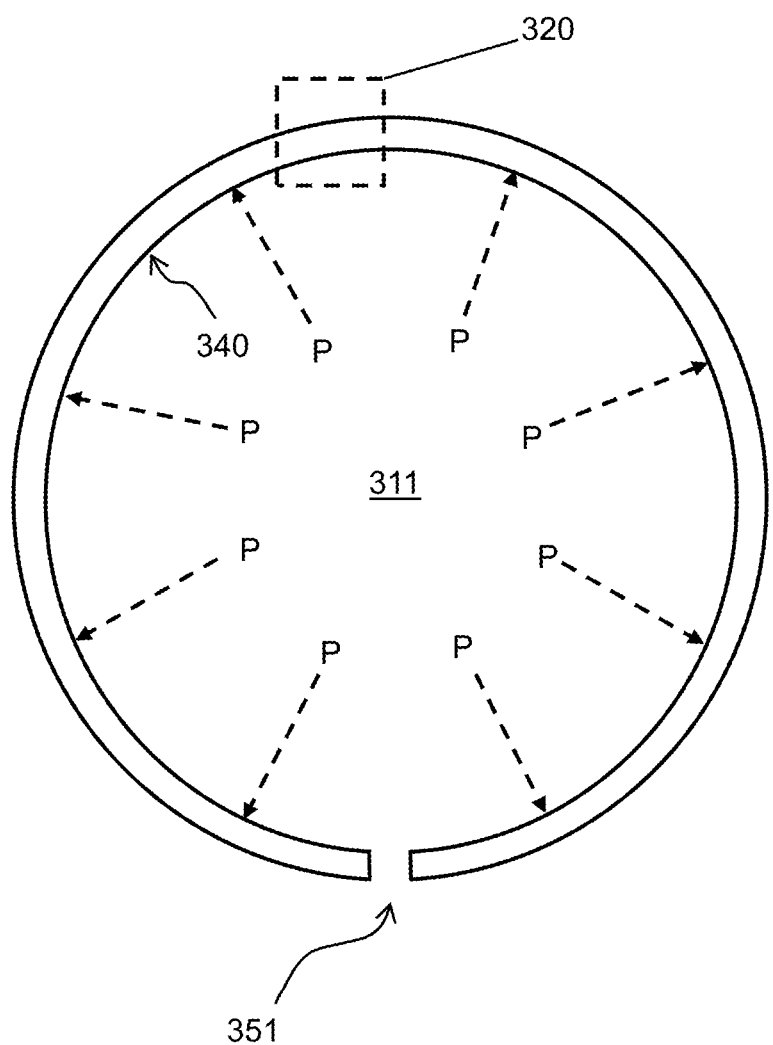
FIG. 3A shows an axial view of an illustrative sealing ring, with a pressure load, in accordance with some embodiments of the present disclosure.

For purposes of illustration, exemplar bending stress distributions will now be shown in the context of a sealing ring. FIG. 3A is a schematic of a sealing ring 300 having a single gap 351 (split ring) according to embodiments of the present disclosure. Pressure (e.g., from a high-pressure region) is shown by pressure vectors 311 acting on radially inner surface 340 that defines an inner radius of sealing ring 350, pushing sealing ring 350 outward during operation.

Figure 3B:
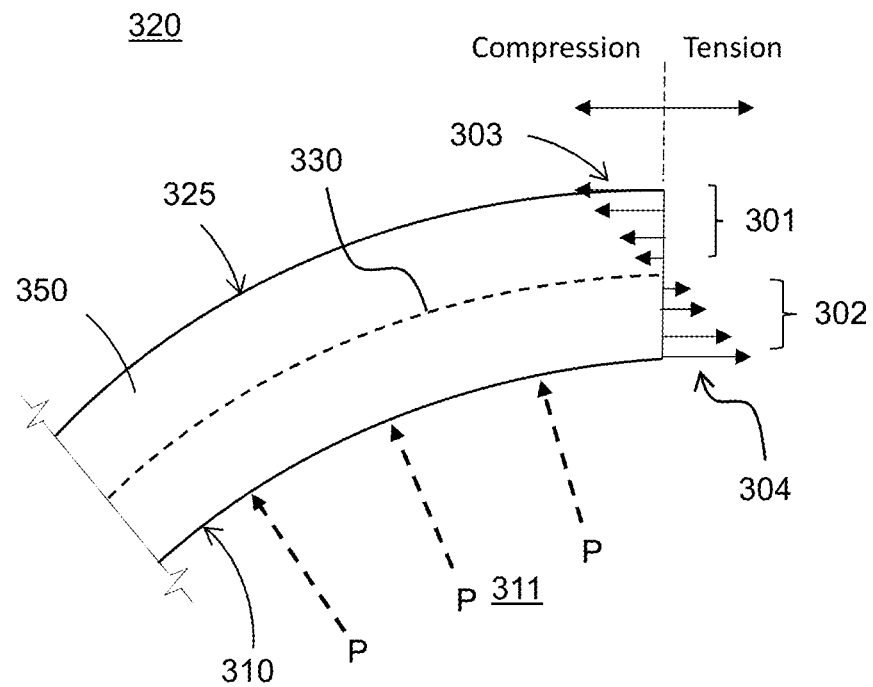
FIG. 3B shows a portion of illustrative sealing ring of FIG. 3A, showing stress vectors on an end section, in accordance with some embodiments of the present disclosure.

FIG. 3B shows ring portion 320 of sealing ring 300 from FIG. 3A in a region on the opposing side of gap 351, to illustrate an example of the state of stress during a pressure load cycle. In this example, sealing ring 350 is made of a single material, that is, not reinforced. FIG. 3B shows an exemplar stress distribution acting on the right side of ring portion 320. Pressure 311 acting on sealing ring 350 causes a predominantly bending state of stress in sealing ring 350. The bending stress is indicated by arrows pointing azimuthally into sealing ring 350, indicating "compression", while arrows pointing azimuthally away from the seal section indicate "tension" in sealing ring 350. One skilled in the art will recognize that the stress distribution is indicative of beam bending stress, and the direction of tension/compression are generally in the azimuthal direction, which may also be referred to as the hoop direction.

As the pressure forces the sealing ring 350 outward, a compressive stress 301 is developed on the radially outer region of the sealing ring 350, and tensile stress 302 is developed on the radially inner region of the sealing ring 350. The stress distribution passes through neutral axis 330 where the stress is zero, and the peak compressive stress 303 occurs at the outer radius 325 of sealing ring 350, and the peak tensile stress 304 occurs at the inner radius 310. Thus, when a ring made of a material that is weak in tension (e.g., some brittle materials or those with low fracture toughness) experiences such a stress distribution, the ring will tend to fail at the inner radius where the tensile stress occurs because.

Figure 4:
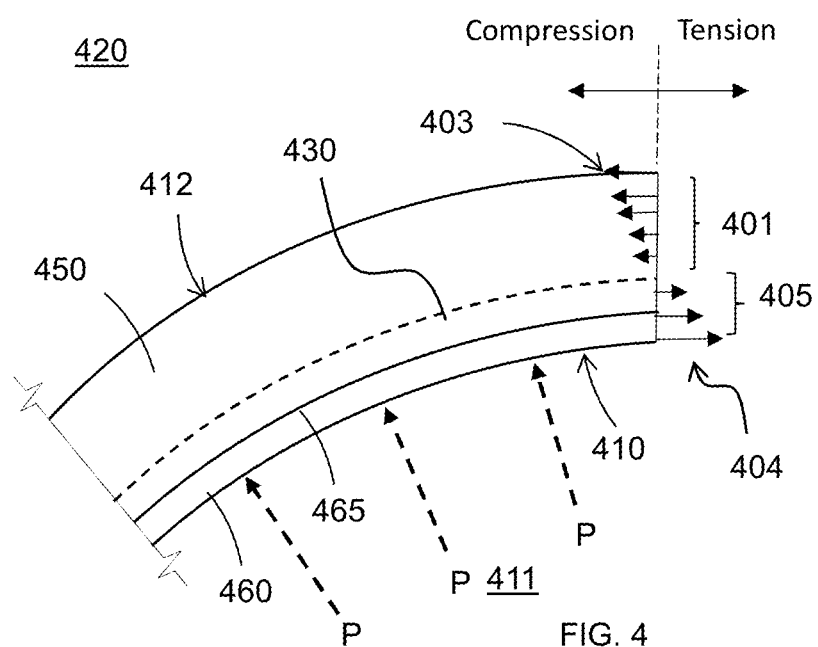
FIG. 4 shows a portion of an illustrative sealing ring, with a reinforcement, in accordance with some embodiments of the present disclosure.

FIG. 4 shows a portion of an illustrative sealing ring, with reinforcement 460, in accordance with some embodiments of the present disclosure. Ring portion 420 of the illustrative sealing ring has a composite construction as shown in FIG. 4. FIG. 4 is shown in a similar detail view as that depicted in FIG. 3, to illustrate an exemplar stress distribution of a reinforced sealing ring as compared to a non-reinforced sealing ring. Ring portion 420 includes reinforcement 460 attached at interface 465 to sealing ring 450. In embodiments, interface 465 may comprise a bonded or brazed joint or other type of connection suitable for joining reinforcement 460 and sealing ring 450 such that structural forces are transmitted between sealing ring 450 and reinforcement 460 (i.e., there is substantially no slip between the two materials). Furthermore, reinforcement 460 and sealing ring 450 are configured to remain attached at interface 465 regardless of whether radial pressure is applied; that is, in some embodiments, the applied pressure 411 is not required to keep the reinforcement engaged with sealing ring 450 because interface 465 is not merely a contact interface, it is a physical connection (e.g., brazed, adhered, interlocked, or otherwise attached). Reinforcement 460 may have a higher stiffness than sealing ring 450; the increased stiffness may be due to geometrical or material characteristics or a combination thereof. For example, the sealing ring 450 may be made of a polymeric material or a graphite compound. By way of non-limiting example, sealing ring 450 may be made of a material having a modulus of elasticity of about 2 GPa to 12 GPa. Whereas reinforcement 460 may have a much greater modulus of elasticity, for example, the reinforcement may have a modulus of elasticity of 100 GPa to 200 GPa. Therefore, a relatively thin reinforcement can have a significant stiffening effect on the sealing ring.

Similar to the non-reinforced configuration (as discussed with respect to FIG. 3B), the same pressure 311 acting on the ring portion 420 may cause a predominantly bending state of stress in ring portion 420. As pressure 311 forces ring portion 420 radially outward, a compressive stress 401 is developed on the radially outer region of ring portion 420, and tensile stress 405 is developed on the radially inner region of ring portion 420. The stress distribution passes through neutral axis 430 where the stress is zero, and the peak compressive stress 403 occurs at outer radius 412 of ring portion 420, while peak tensile stress 404 occurs at the inner radius 410. The added stiffness imparted by reinforcement 460 tends to reduce the stresses in the sealing ring 450. This is graphically depicted by the reduced compressive stress 401 and reduced tensile stress 405 in sealing ring 450 as compared to the stress distribution depicted in ring portion 420 of the sealing ring segment. Furthermore, neutral axis 430 tends to shift radially inward, as shown in FIG. 4, toward reinforcement 460, resulting in a reduction of tensile stress 405 on sealing ring 450 if the overall geometry of the sealing ring 350 is the same as sealing ring 300 of FIG. 3A. In embodiments where sealing ring 450 is made of a material having a relatively low tensile strength, the shift in neutral axis is particularly beneficial because less of the cross-section of sealing ring 450 is exposed to a state of tensile stress and the peak tensile stress is reduced.

One skilled in the art will recognize that the stress relationships described above in the context of a ring with a single gap may also exist in ring arrangements with more than one gap, such as a 180 degree segment (e.g., a two-segment ring), or a 90 degree segment (e.g., a four-segment ring), or a 45 degree segment (e.g., an eight-segment ring); in such cases, the stress distribution and the effect of the reinforcement may be similar to the examples illustrated above because the inner radial pressure tends to force the ring outward into contact with the cylinder wall, causing some bending stress due to the mismatch in the radius of the sealing ring and the cylinder wall.

Furthermore, the state of stress at various locations in a ring segment may be more complicated than the examples illustrated herein due to factors such as the complex shear interaction and load transfer at or near the interface between dissimilar materials (e.g., the reinforcement, the seal, and the bonding layer). Additionally, as the ring segment expands, it impacts a cylinder wall, and this contact may impart a radial force to the ring and cause a lever point for bending as well as a radial force and stress on the sealing ring. While the reinforcement may also reduce these localized or non-azimuthal stresses, the larger magnitude of stresses may be in the bending or azimuthal (hoop) direction, so the effect of the reinforcement is illustrated with respect to the bending state of stress for illustrative purposes.

In some embodiments, the reinforcement may be very thin compared to the ring segment such as, for example, a sheet of metal such as molybdenum that is a fraction of a millimeter thick (e.g., 125 microns, or between about 50 microns and 650 microns). The reinforcement may be a small fraction of the overall thickness of the ring segment, such as 1%, so that a 9 mm thick ring segment may have a reinforcement that is 0.9 mm thick or about 0.035". In some embodiments having a thin reinforcement the thickness of the reinforcement may be between about 1% and 10% of the thickness of the ring segment. In such designs, the reinforcement need not have appreciable bending stiffness on its own because it is thin. However, when attached to the inner radius of a seal, the resulting seal assembly may exhibit a higher bending stiffness and strength and, therefore, reduced stress as compared to the seal alone. This is because the reinforcement, having a high modulus of elasticity, acts as a tensile stiffening element at the outer fiber (inner diameter) of the seal. In other embodiments, the reinforcement may have an equivalent or lower stiffness than the sealing ring, but a higher tensile strength or toughness. In this embodiment, the sealing ring may be held together by the thin reinforcement at the inner radius of the sealing ring, allowing even small defects or fractures in the sealing ring while the reinforcement remains intact. One design consideration is that the reinforcement should have an adequate tensile strength to withstand the stress induced in the reinforcement under pressure loading as the ring segment expands.

Figure 5:
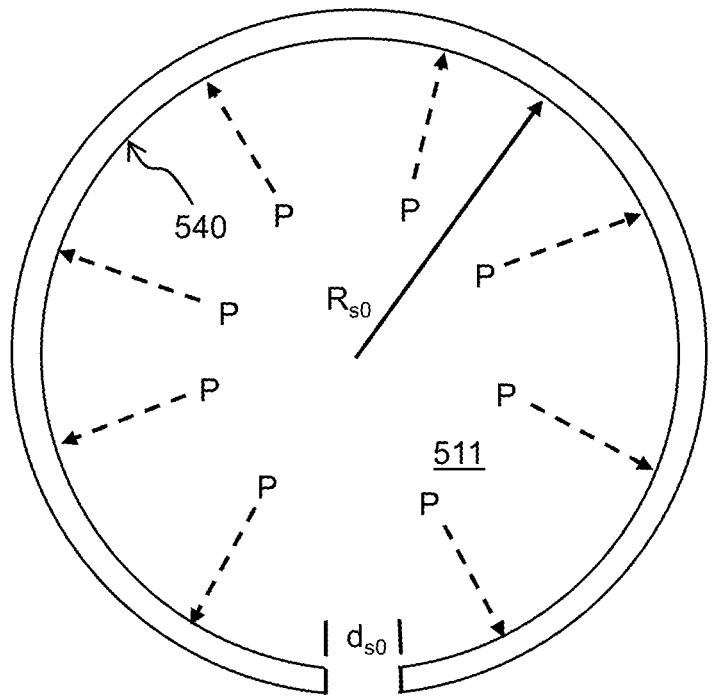
FIG. 5 shows an axial view of an illustrative sealing ring, with a pressure load, in accordance with some embodiments of the present disclosure.
Figure 6:
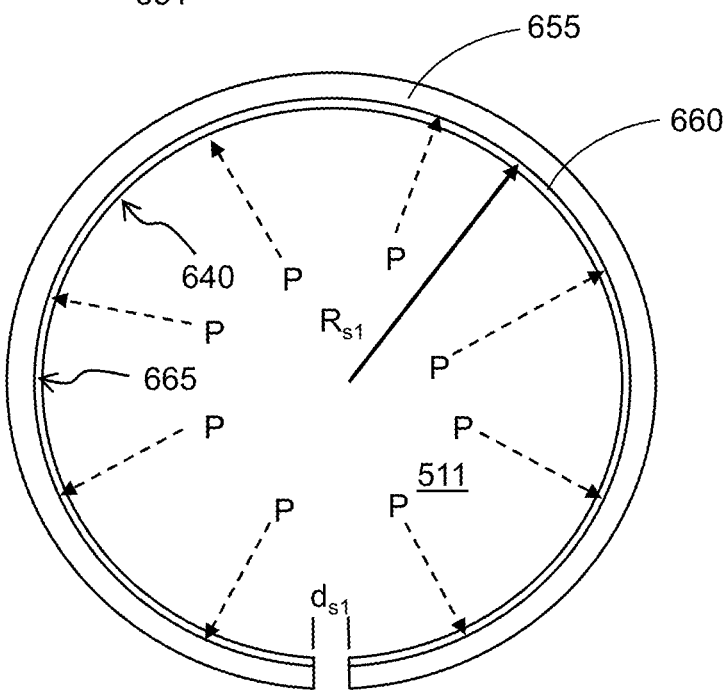
FIG. 6 shows an axial view of an illustrative reinforced sealing ring, with a pressure load, in accordance with some embodiments of the present disclosure.

The overall deformation of a sealing ring having a reinforcement is illustrated in FIGS. 5 and 6, which compare the deformation of a non-reinforced sealing ring to a reinforced sealing ring, under a similar pressure load and not bound by a cylinder bore, according to embodiments of the present disclosure. Sealing ring 500 does not have a reinforcement, and it is shown in a deformed state as it is loaded by pressure 511, acting radially outward on inner surface 540. Sealing ring 500 deforms to a radius $Rs_0$, and gap 551 opens to $ds_0$ as the sealing ring 500 exhibits bending stresses similar to those described in more detail above.

FIG. 6 shows a sealing ring assembly 600 having reinforcement 660 attached at an interface 665 to sealing ring 655. Sealing ring assembly 600 is shown in a deformed state as it is loaded by pressure 511 acting radially outward on inner surface 640. Sealing ring 500 deforms to a radius $Rs_1$, and gap 651 opens to $ds_1$ as the sealing ring assembly 600 exhibits bending stresses. Notably, sealing ring assembly 600 deforms less than unreinforced sealing ring 500, that is, $ds_1 < ds_0$ and $Rs_1 < Rs_0$. Thus, in this illustrative case of a ring that is not bound by a cylinder bore, the sealing ring with an attached reinforcement exhibits less radial deflection and lower stresses.

In use, however, as a sealing ring assembly displaces radially, the sealing ring is forced against a cylinder wall as the ring segment translates and deforms due to the radial forces of a high-pressure section (e.g., a compression section, a reaction section, or both). In this displacement-constrained load scenario, where the ring dilation is constrained by contact with the cylinder wall, the maximum deflection of a reinforced sealing ring may be the same as that of a non-reinforced sealing ring because the overall extent of the deflection is bounded by the cylinder wall. Therefore, the reinforced sealing ring may exhibit lower tensile stresses in the sealing ring, similar to the stresses shown in FIG. 4, as compared to the unreinforced seal (FIG. 3B) because the reinforcement carries a portion of the tensile stress at the inner diameter. Furthermore, in this scenario, the tensile strength of the reinforcement governs the strength of the sealing ring assembly because the overall displacement of the seal is fixed (i.e., it is bounded by the bore). However, for a given pressure loading condition, a sealing ring assembly that is reinforced will exert a lower pressure on at least portions of the cylinder wall that form a seal with the sealing ring due to the increased bending stiffness counteracting the applied pressure.

Figure 7:
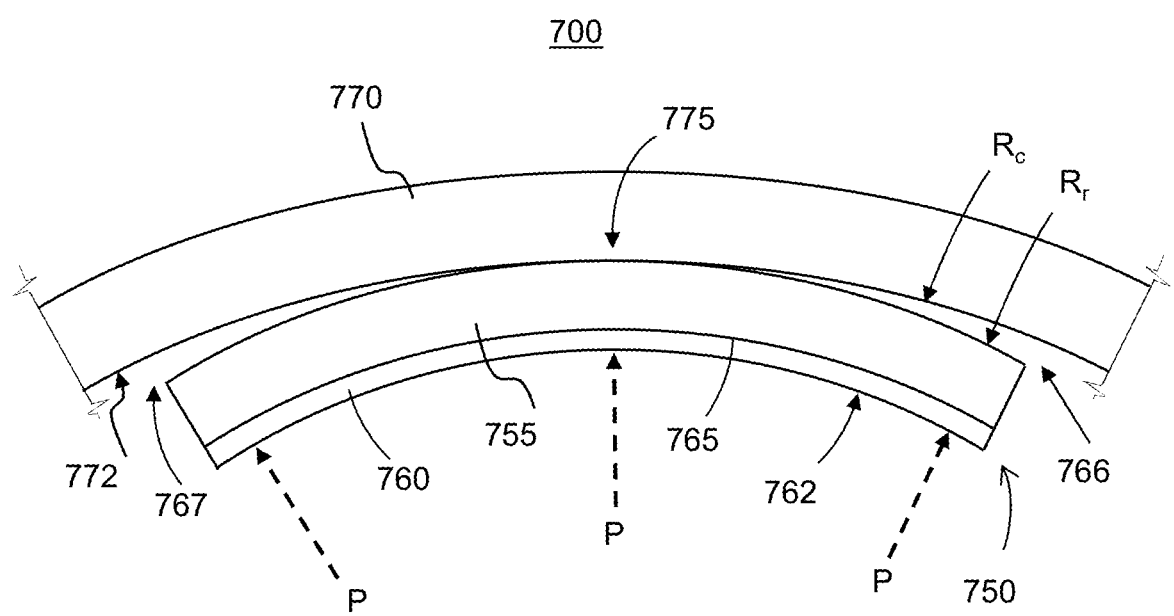
FIG. 7 shows a cross-sectional axial view of a portion of an illustrative piston and cylinder assembly, with a reinforced sealing ring, in accordance with some embodiments of the present disclosure.

FIG. 7 shows an axial view of a portion of illustrative piston and cylinder assembly 700, with sealing ring segment 750, in accordance with some embodiments of the present disclosure. Sealing ring segment 750 comprises a sealing ring 755 and a reinforcement 760 affixed along interface 765. Note that although no piston is illustrated in FIG. 7 for purposes of clarity, ring segment 750 is configured to be arranged in a ring groove of a piston within cylinder 770. Ring segment 750 may be configured to move with a piston during, for example, a piston stroke (e.g., a compression stroke, an expansion stroke, or both). Ring segment 750 may have adjacent ring segments or gap cover elements located at its azimuthal ends; for clarity, only ring segment 750 is shown to illustrate how it interacts with cylinder 770 in some embodiments.

High pressure P, incident on radially inner surface 762 that defines an inner radius of ring segment 750, forces ring segment 750 to translate radially outward where it comes into contact with cylinder wall 772 at contact region 775. Upon contact, there may be gaps 766 and 767 (not shown to scale) between ring segment 750 and cylinder wall 772 because outer radius $R_r$ of ring segment 750 is smaller than cylinder wall radius $R_c$. One skilled in the art would recognize that this difference in radii may increase as the ring segment wears, and the shape of the ring segment may change with wear. After contact with cylinder wall 772, pressure P causes ring segment 750 to deform in bending, and, as such, it may have a stress distribution similar to that shown in FIG. 4. As ring segment 750 bends, gaps 766 and 767 decrease, and contact region 775 enlarges. A larger contact area may lead to more uniform wear along the outer radius $R_r$ of ring segment 750 and a lower overall wear rate of sealing ring 755.

In some embodiments, the region of greatest wear on outer radius $R_r$ of ring segment 750 is narrow, and in other embodiments, it may be wider depending on the flexibility of ring segment 750. A more flexible ring segment will seat against the wall along a larger contact interface (e.g., a larger area), tending to eliminate any end gaps between the sealing ring and the cylinder wall which is desirable for sealing. One design tradeoff is balancing the amount of deflection of the ring segment with the tensile stress limit that the sealing ring can withstand.

The stiffness of a ring segment may be tailored by geometrical or material characteristics of the reinforcement. For example, a reinforcement that is radially thicker or made of a higher modulus material will provide a stiffer ring segment and tend to stress-shield the sealing ring, resulting in lower tensile stress in the sealing ring. However, the stiffer ring segment will undergo less deformation leading to a narrower peak wear region on the sealing ring. Thus, the stiffness of the ring segment affects the contact pressure distribution of the sealing ring against the cylinder wall and the concomitant wear of the sealing ring. In some embodiments, a ring segment may be designed to wear more in an azimuthally central section of the sealing ring with the wear tapering toward the ends of the ring segment. In other embodiments, the ring segment may exhibit a "U" shaped wear pattern that has a relatively constant amount of wear across a broad portion of the sealing ring's outer radius, which tapers down to less wear at the ends of the sealing ring (e.g., the azimuthal ends).

In some embodiments, the ring segment may have a non-uniform structural shape (and hence stiffness) along its azimuthal length that can be tailored to result in different cylinder contact pressure profiles and stress distributions in the sealing ring. For example, the reinforcement may be thicker in the center portion while the sealing is thinner in this center portion, allowing more of the peak tensile stress to be held by the reinforcement where the bending stress is greatest. In other example embodiments, the reinforcement may be tapered along its azimuthal length. In some embodiments, the reinforcement may be located on one or both axial sides of the sealing ring, and the radial height of the reinforcement may also be tapered along the azimuthal length of the ring segment. In general, the cross-section of the ring segment may have any azimuthally varying shape that provides a desired cylinder wall contact force distribution and state of stress in the sealing ring.

Figure 8:
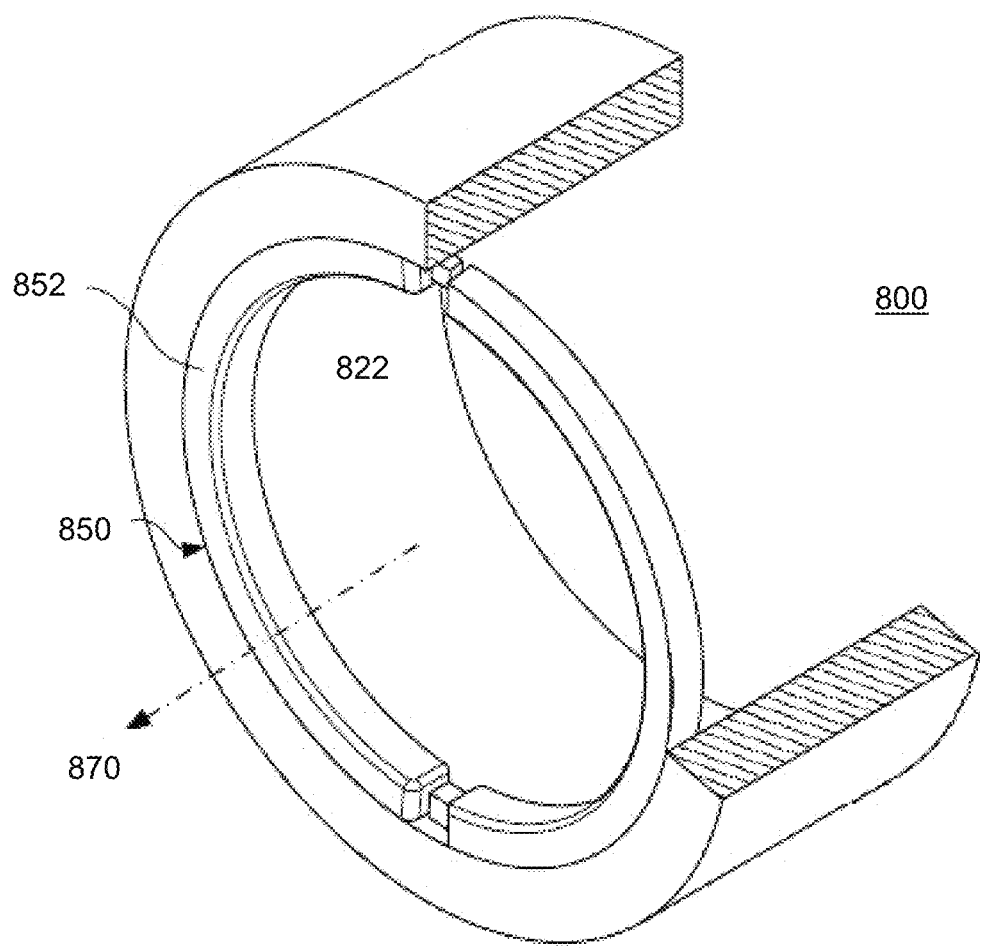
FIG. 8 shows a cross-sectional perspective view of a portion of an illustrative piston and cylinder assembly, with a sealing ring assembly, in accordance with some embodiments of the present disclosure.

FIG. 8 shows a cross-sectional perspective view of a portion of illustrative piston and cylinder assembly 800, with sealing ring assembly 850, in accordance with some embodiments of the present disclosure. Note that although no piston is illustrated in FIG. 8 for purposes of clarity, sealing ring assembly 850 is configured to be arranged in a ring groove of a piston within bore 822. Sealing ring assembly 850 may be configured to move with a piston along axis 870 during, for example, a piston stroke.

Sealing ring assembly 850 includes first sealing ring 852, which each include two respective ring segments. For example, sealing ring 852 includes two ring gaps, as shown in FIG. 8. Accordingly, in embodiments including more than one sealing ring, by not aligning (e.g., azimuthally) the ring gaps of adjacent sealing rings, significant leakage may be prevented as sealing ring assembly 850 wears.

In accordance with the present disclosure, in some embodiments, a sealing ring assembly, or ring segment thereof, is created out of a metal-graphite (or any other suitable metal-ceramic, metal-polymer, ceramic-polymer or ceramic-ceramic) composite structure. For example, referencing sealing ring assembly 850 of FIG. 8, sealing ring 852 may include a composite structure. Although not shown in FIG. 8, a sealing ring assembly may include more than one ring, with each ring including one or more respective ring segments. In some embodiments, in which more than one ring is included, one or more rings, or all of the rings, may include a reinforcement, in accordance with some embodiments of the present disclosure.

In an illustrative example, a composite structure may be created by bonding (e.g., brazing or adhering) a thin sheet of metal to the inner diameter (ID) of a ceramic ring or ring segment. In some embodiments, the composite structure moves the ceramic boundary on the ID of the ring or ring segment closer to the neutral axis. Accordingly, the outer "fibers" of the composite structure (e.g., which see the highest tensile stresses when expanding to seal) are arranged in the metal layer rather than in the ceramic. In some embodiments, the composite structure puts the ID of a sealing ring in compression in its neutral state, resulting in compressive "preloading" that counteracts tensile loads induced during expansion. In some embodiments, the composite structure increases the bending stiffness of a sealing ring assembly, which reduces the likelihood of breakage when operating over an unsupported span in a cylinder (e.g., such as a port for gas exchange).

Figure 9:
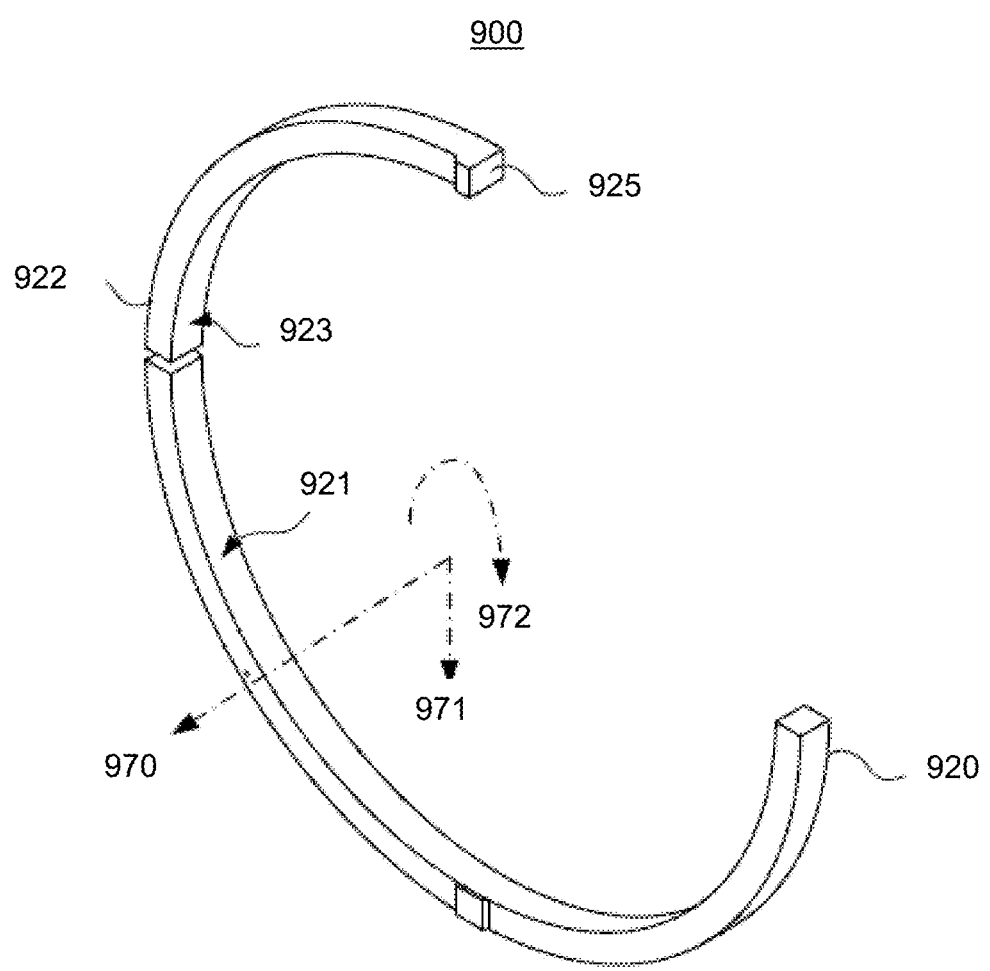
FIG. 9 shows a cross-sectional perspective view of a portion of an illustrative sealing ring assembly, with ring segments and reinforcements, in accordance with some embodiments of the present disclosure.
Figure 10:
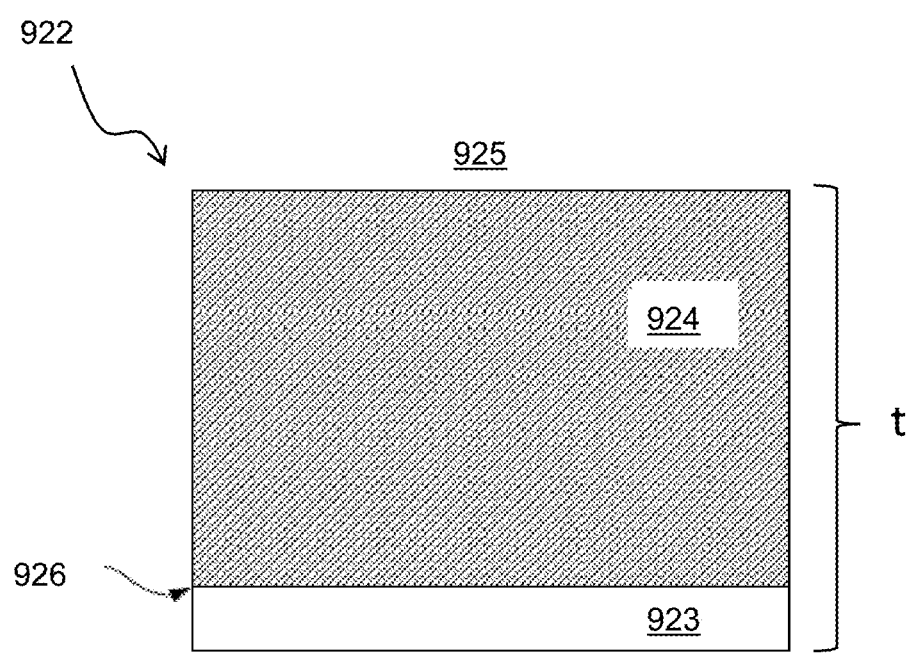
FIG. 10 shows a cross-sectional view of the illustrative sealing ring assembly of FIG. 9, with a sealing ring and a reinforcement, in accordance with some embodiments of the present disclosure.

FIG. 9 shows a cross-sectional perspective view of portion 900 of an illustrative sealing ring assembly, with ring segments 920 and 922 and respective reinforcements (e.g., metal or ceramic reinforcing layers) 921 and 923, in accordance with some embodiments of the present disclosure. In FIG. 9, axis 970 is in the axial direction, axis 971 is in the radial direction, and axis 972 is in the azimuthal direction (e.g., around axis 970). Reinforcement 921 is affixed to ring segment 920, azimuthally along an inner radial surface of ring segment 920. Reinforcement 923 is affixed to ring segment 922 azimuthally along an inner radial surface of ring segment 922. In some embodiments, reinforcements such as one or more metal, composite, or ceramic layers, for example, are brazed onto suitable surfaces of respective ring segments 920 and 922. FIG. 10 shows a cross-sectional view of portion 900 of illustrative sealing ring assembly of FIG. 9, defined by section 925 of FIG. 9, with ring segment 922, seal 924, and reinforcement 923, in accordance with some embodiments of the present disclosure. Section 925 has a total radial thickness t which includes both seal 924 and reinforcement 923. Interface 926 is defined as the spatial region where seal 924 meets reinforcement 923. Interface 926 may include one or more materials arranged between seal 924 and reinforcement 923. In some embodiments, interface 926 includes brazing material, adhesive, any other suitable material that may transmit shear forces between seal 924 and reinforcement 923, or any combination thereof. In some embodiments, interface 926 may include a bonding layer (e.g., a brazing layer, an adhesive layer, any other suitable layer, or any combination thereof), about which reinforcement 923 and seal 924 are arranged opposite each other.

Figure 11:
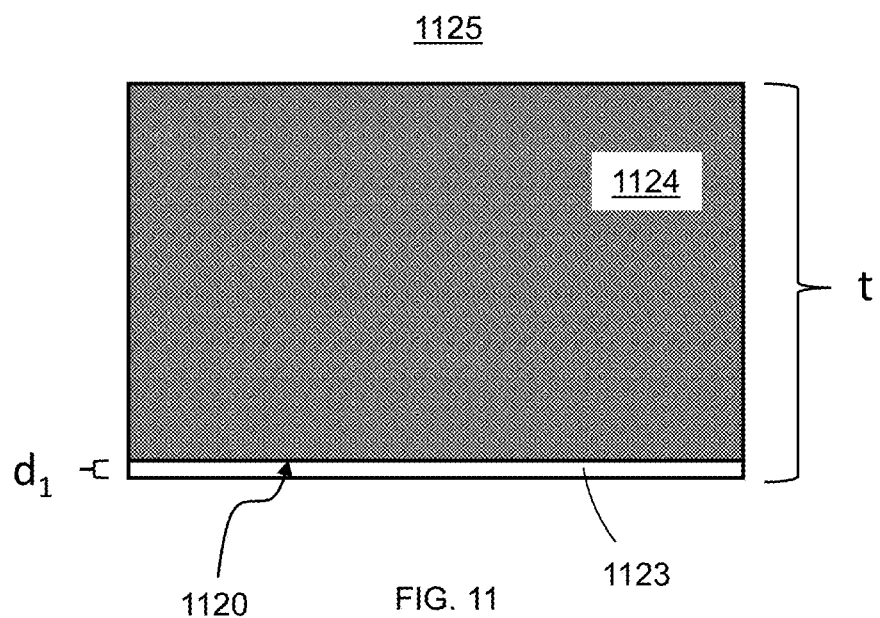
FIG. 11 shows a cross-sectional view of an illustrative sealing ring, with a reinforcement, in accordance with some embodiments of the present disclosure.

In some embodiments, the sealing ring assembly may be made of components having various alternative geometric arrangements and relative sizes, as illustrated in the examples shown in FIGS. 11-14. For example, FIG. 11 shows another embodiment of a section 1125 of a sealing ring assembly in a cross-sectional view similar to the view shown in FIG. 10. Reinforcement 1123 is affixed to seal 1124 azimuthally along an inner radial surface of seal 1124 at interface 1120. Interface 1120 may include a bonding layer, about which reinforcement 1123 and seal 1124 are arranged opposite each other. In some embodiments, reinforcement 1123 may be made of a metal, composite, or ceramic layer that is, for example, bonded via brazing (e.g., a brazing layer) or adhesive bonding (e.g., an adhesive layer) onto seal 1124 such that there is substantially no slip between the two materials. In section 1125, reinforcement 1123 is relatively thin, having a thickness $d_1$, which may be a small fraction of overall thickness t of section 1125, as shown. For example, reinforcement 1123 may be a thin-walled section (e.g., a sheet) having a thickness $d_1$ of about 127 microns (or 50 microns-500 microns), whereas the overall thickness t of section 1125 may be approximately 3 mm or up to approximately 10 mm. Thus, in embodiments, $d_1$ may be less than 1% of overall thickness t of section 1125. In other embodiments, the thickness of the reinforcement may be a larger fraction of the overall cross-sectional thickness such as 1%, or up to 10%, or even half (50%) or more of the radial thickness of the overall cross-section of the ring segment.

Figure 12:
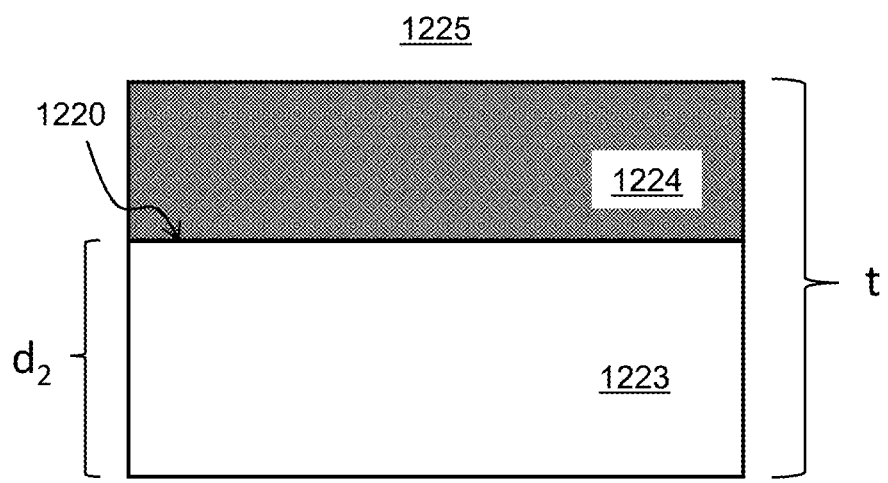
FIG. 12 shows a cross-sectional view of an illustrative sealing ring, with a reinforcement, in accordance with some embodiments of the present disclosure.

FIG. 12 shows another embodiment of a section 1225 of a sealing ring assembly in a cross-sectional view similar to the view shown in FIG. 10. Section 1225 has seal 1224 affixed azimuthally along an outer radial surface of reinforcement 1223 at interface 1220. Interface 1220 may include a bonding layer, about which reinforcement 1123 and seal 1124 are arranged opposite each other. In some embodiments, seal 1224 may be bonded via brazing (e.g., a brazing layer) or adhesive bonding (e.g., an adhesive layer) onto reinforcement 1223. In section 1225, reinforcement 1223 is relatively thick, having a thickness $d_2$, which may be a large fraction of overall thickness t of section 1225, as shown. For example, reinforcement 1223 may have a thickness $d_2$ of 5 mm, whereas the overall thickness t of section 1225 may be 9 mm. Thus, in embodiments, $d_2$ may be equal to or greater than 50% of overall thickness t of section 1225. Thus, in some embodiments, the radially inward-disposed, high-strength ring substantially dictates the stiffness and overall deformation of the ring segment while the outer radial sealing ring provides a low-friction, lubricating interface suitable to bear on a cylinder wall.

In some embodiments, where the reinforcement comprises a relatively large fraction of the overall cross-sectional thickness (or governs the overall stiffness) of a ring segment, the sealing ring assembly may be considered to be a high-strength ring with an attached solid lubricant applicator (sealing ring, lip, or wiper) rather than a sealing ring with an attached reinforcement. That is, structurally, the sealing ring plays a small or negligible part in the overall stiffness and strength of the ring segment, but operates as a seal or solid lubricant applicator, or both.

In some embodiments, the inner radial portion may be less than 1% of the overall radial thickness of the ring segment, or it may be up to 75% of the overall radial thickness of the ring segment. In general, the inner radial portion may be any thickness that satisfies design considerations, which include providing enough exposed seal material such that, during the lifecycle of the ring segment, the seal does not wear down to the extent that excessive leakage occurs or the reinforcement contacts the cylinder wall. Additionally, the reinforcement should be sized such that it provides enough stiffness to reduce the stresses in the seal below acceptable limits while not over stiffening the ring segment such that ring assembly fails to seat with the cylinder wall to provide an acceptable seal.

Figure 13:
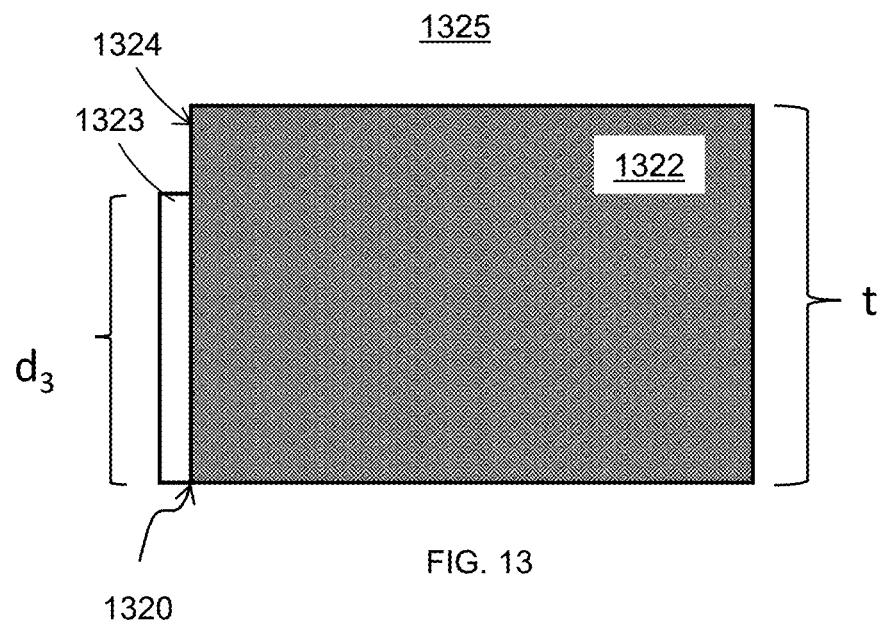
FIG. 13 shows a cross-sectional view of an illustrative sealing ring, with an axial reinforcement, in accordance with some embodiments of the present disclosure.

In some embodiments, a reinforcement may be attached to an axial side of a sealing ring. For example, FIG. 13 shows another embodiment of a section 1325 of a sealing ring assembly in a cross-sectional view similar to the view shown in FIG. 10. Reinforcement 1323 is affixed to seal 1322 on axial surface 1324 of seal 1322 at interface 1320. Interface 1320 may include a bonding layer, about which reinforcement 1323 and seal 1322 are arranged opposite each other. In embodiments, reinforcement 1323 may be bonded via brazing (e.g., a brazing layer) or adhesive bonding (e.g., an adhesive layer) onto seal 1322. In section 1325, reinforcement 1323 may have a radial length $d_3$, which may be a large fraction of overall thickness t of section 1325, as shown. For example, reinforcement 1323 may have a radial length $d_3$ of 3 mm, whereas the overall thickness t of section 1325 may be 5 mm or 6 mm, for example. In other embodiments, the radial length $d_3$ of reinforcement 1323 may be less than 20% of the overall radial thickness of the ring segment, or it may be up to 75% of the overall radial thickness of the ring segment. In general, the radial length of the reinforcement may be any length that satisfies design considerations, which include providing enough exposed seal material such that, during the lifecycle of the seal segment, the seal does not wear down to the extent that excessive leakage occurs or that it wears down to the reinforcement such that the reinforcement contacts the cylinder wall. Additionally, the reinforcement should be sized such that it provides enough stiffness to reduce the stresses in the seal below acceptable limits while not over stiffening the ring segment such that ring assembly fails to seat with the cylinder wall to provide a suitable seal. Finally, the reinforcement should be thin enough so that the ring assembly fits axially into a ring groove of a piston.

Figure 14:
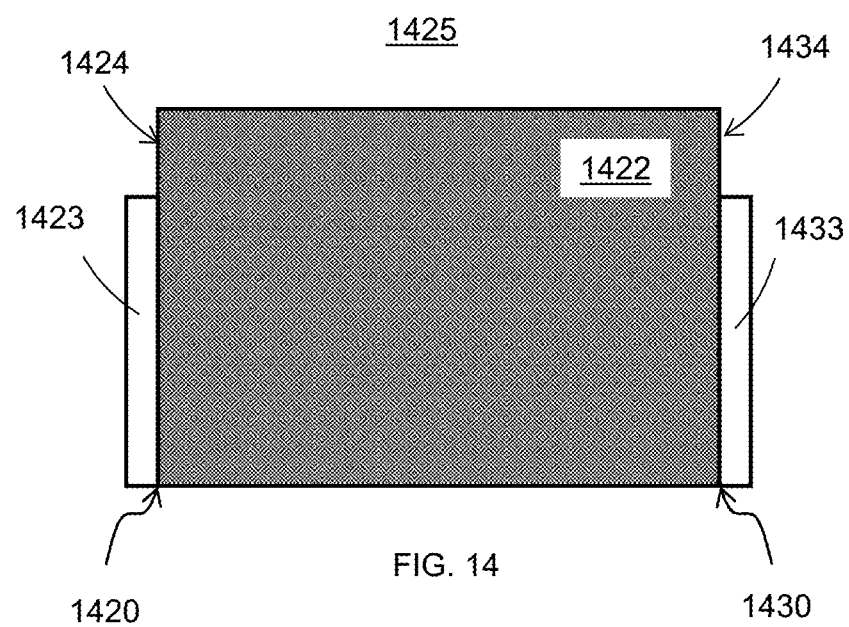
FIG. 14 shows a cross-sectional view of an illustrative sealing ring, with two axial reinforcements, in accordance with some embodiments of the present disclosure.

FIG. 14 shows another embodiment having reinforcements attached to both axial sides of a seal in accordance with the present disclosure. Section 1425 is shown in a cross-sectional view similar to the view shown in FIG. 10. Reinforcement 1423 is affixed to seal 1422 at first axial surface 1424, and reinforcement 1433 is affixed to seal 1422 at second axial surface 1434 of seal 1422. In some embodiments, reinforcements 1423 and 1433 may be bonded via brazing or adhesive bonding onto seal 1422 at interfaces 1420 and 1430, respectively. Interfaces 1420 and 1430 may each include a bonding layer, about which seal 1422 is arranged opposite to reinforcements 1423 and 1433. Reinforcements 1423 and 1433 may have the same thickness and radial length or they may have different thicknesses or radial lengths depending on design and fit constraints.

In embodiments shown in FIGS. 9-14, the seal (e.g., any of seals 924, 1124, 1224, 1322, and 1422) may be made of a polymeric material (e.g., PTFE, Nylon, PEEK, PTFE/Silicone), a ceramic (e.g., graphite), or a graphite or ceramic composite (e.g., SiC/graphite), or any combination thereof. In some embodiments the seal is made of a self-lubricating material. In embodiments shown in FIGS. 9-14, the reinforcement (e.g., any of reinforcements 923, 1123, 1223, 1323, 1423, 1424) may be made of a metal such as steel, Tungsten, molybdenum, or alloys thereof, other metal alloys, Ni-Resist D5, Kovar, Invar, or any other suitable material or combination of materials. In some embodiments, the reinforcement may be made of a ceramic or a composite material such as a ceramic matrix composite (CMC), a metal matrix composite (MMC), or a fiber-reinforced plastic such as carbon fiber reinforced polymer (CFRP).

In some embodiments, a reinforcement such as, for example, a metal or ceramic layer, is segmented, including two or more segments arranged azimuthally along a sealing ring. In some embodiments, a reinforcement may include more than one layer or lamination. For example, referencing FIG. 10, reinforcement 923 may be replaced by several metal layers, ceramic layers, or a combination thereof, bonded in a stack, and each having corresponding composition and properties.

In an illustrative example, a ring segment (e.g., a ring segment of sealing ring 852 of FIG. 8, ring segment 922 of FIGS. 9-10, or a ring segment having a section illustrated in FIGS. 11-14) may include a reinforcement that includes a brazed metal or ceramic layer at its ID. The metal layer may, as an illustrative example, be made of a thin sheet of molybdenum (e.g., 0.001"-0.020" thick), and may be brazed to the ring segment (e.g., using a brazing foil to affect the bond). The metal layer may have any suitable thickness and metal composition as appropriate for the application and particular properties of the ring segment (e.g., a graphite body to which the reinforcement is affixed). In a further example, the sealing ring may, as an illustrative example, be made of 4-9 mm thick graphite and may be brazed to the reinforcement. It will be understood that, in a two-ring arrangement, any suitable arrangement of sealing rings, having any suitable ring segments, may be used and that a reinforcement may be affixed to one or more of the ring segments in accordance with the present disclosure.

In some embodiments, a material used as a reinforcement is selected based on a value of its coefficient of thermal expansion (CTE) as compared to the CTE of the seal, which may be ceramic (e.g., graphite). Selecting materials that have closely matching CTEs near operating temperatures (e.g., of an engine, air compressor, or other piston-cylinder device) reduces thermally induced stresses in the joint (i.e., interface) during operation. In some embodiments, a difference in CTEs of the two materials, at brazing temperatures, can be taken into consideration to optimize between residual stresses in the braze joint and inducing a compressive preload in the relatively brittle material. For example, to cause a compressive preload in the brittle material (e.g., graphite), a reinforcement material may be selected having higher CTE than the brittle material at a brazing temperature. Accordingly, when the sealing ring assembly cools, the reinforcement is prevented from contracting fully to a zero-stress state because it is attached, via the braze, to the sealing ring. That is, as the ring assembly cools, the reinforcement reduces in arc length until it is in balance with the compressive resistance provided by the ring segment, leaving the reinforcement in tension and the ring segment at least partially in compression at a temperature below the brazing temperature, such as room temperature or an operating temperature.

Figure 15:
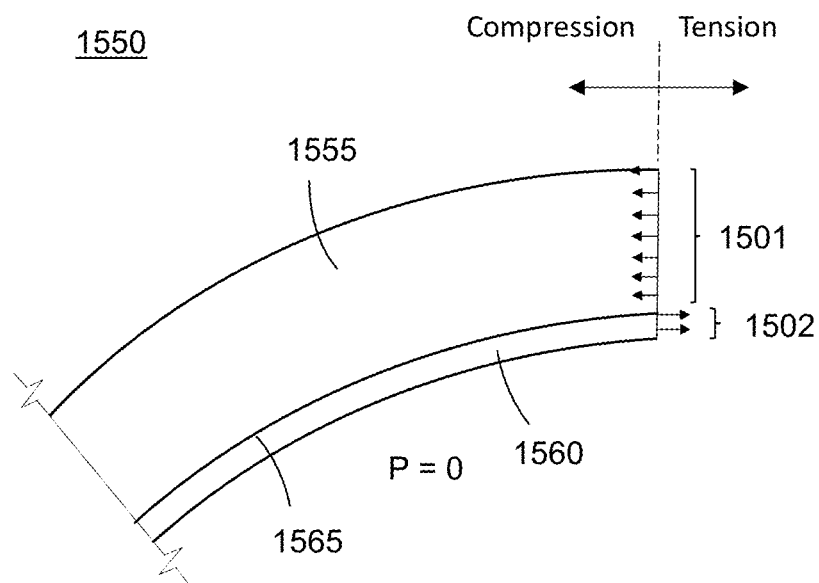
FIG. 15 shows a portion of an illustrative sealing ring, with a preloaded reinforcement, in accordance with some embodiments of the present disclosure.

FIG. 15 illustrates an embodiment of a portion of sealing ring portion 1550, having a composite construction in a similar detail view to that depicted in FIG. 4 to illustrate an exemplar stress distribution. Notably, sealing ring portion 1550 is unloaded in this example; that is, there is no pressure (P=0, as compared to a suitable reference such as the outer radial surface of the sealing ring, indicative of a uniform pressure field) applied on the radially inner surface of sealing ring portion 1550. Sealing ring portion 1550 is shown in a cooled state (e.g., at room temperature or at an operating temperature of 700 C) after brazing at a higher temperature (e.g., 1100 C). Reinforcement 1560 and sealing ring 1555 are affixed via interface 1565 once the braze (or other bond) forms, resulting in a preloaded state of stress in sealing ring 1555. The stress distribution shown is a result of cooling the affixed materials having disparate CTEs; in this example, the CTE of the reinforcement 1560 is greater than that of the sealing ring 1555. As such, the sealing ring 1555 has a compressive stress 1501 across some or all of its thickness, and the reinforcement 1560 has a tensile stress 1502 across some or all of its thickness. While the stress distributions 1501 and 1502 are shown as constant across each of the sealing ring 1555 and the reinforcement 1560, they may be nonconstant or even nonlinear across the surface depending on material properties such as the modulus of elasticity and the CTE's of the sealing ring 1555 and reinforcement 1560. If, for example, the CTEs are the same, then there may be no temperature-induced preload stress in the sealing ring.

Figure 16:
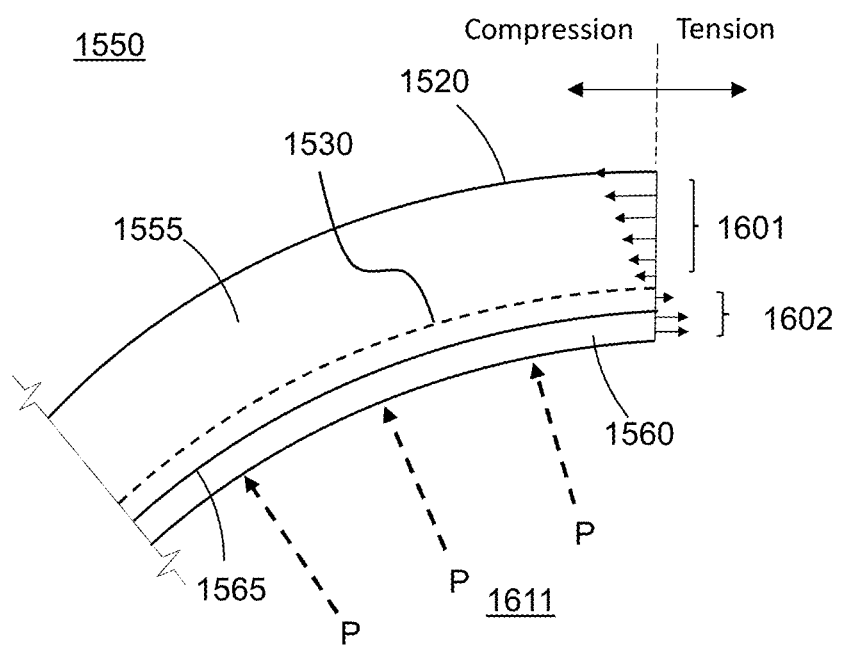
FIG. 16 shows the portion of an illustrative sealing ring of FIG. 15, with a preloaded reinforcement and a pressure load, in accordance with some embodiments of the present disclosure.

FIG. 16 shows the same sealing ring portion 1550 in a loaded state with pressure 1611 acting on the radially inner surface (e.g., defining an inner radius). The bending stress superimposes on the residual preloaded stress that was shown in FIG. 15. The combined state of stress results in an increase in the tensile stress 1602 in reinforcement 1560 and an increase in compressive stress 1601 toward outer fiber 1520 of sealing ring 1555. In some embodiments, sealing ring 1555 may exhibit compressive stress 1601 that may be less than in the unloaded (but preloaded) state, but remains entirely in compression, which may be advantageous if the sealing ring is made of a material that is weak in tension.

Neutral axis 1530 tends to be located more radially inward for assemblies that have a greater mismatch in CTE between sealing ring 1555 and reinforcement 1560. However, if the neutral axis 1530 is located radially outward from the interface 1565, there will be some tensile stress in sealing ring 1555. In some embodiments, the tensile stress may be below the tensile stress limit for the material (e.g., yield stress or ultimate stress). This lowered state of tensile stress during operation may increase the survivability of the seal.

One skilled in the art will recognize that the state of stress in such a preloaded composite structure depends on many factors such as the material properties (e.g., CTE and modulus of elasticity) as well as the geometry (e.g., thickness and width) of each component. The stress distributions illustrated herein are to illustrate the preload effect and the change in stress state when the ring assembly is loaded but are not intended to depict actual stress distributions or to be limiting in any way.

In some circumstances, a reinforcement (e.g., a metal) having a CTE, at a brazing temperature, that is too large compared to the brittle material may cause the braze joint to fail due to high residual stress. In some embodiments, for example, a reinforcement may be selected based on tensile strength and CTE at a suitable temperature.

In some embodiments, a CTE of a ring or ring segment and a CTE of a reinforcement are matched. For example, a ring segment may include graphite, and a reinforcement may include Molybdenum (e.g., 99% pure Molybdenum or any other suitable grade), Tungsten, Ni-Resist D5, Kovar, Invar, or any other suitable material or combination of materials. In some embodiments, the reinforcement may be made of a composite material such as a ceramic matrix composite (CMC), metal matrix composite (MMC), or a fiber-reinforced plastic such as carbon fiber reinforced polymer (CFRP). Matched CTEs, as referred to herein, refers to selecting a seal material and reinforcement material having corresponding CTE values that achieve some suitable constraining criterion. For example, the criterion may include the CTEs being within a threshold (e.g., at a temperature), the CTE mismatch being within a threshold (e.g., at a temperature), a maximum expansion of the components being within threshold (e.g., at a temperature), a maximum stress at an interface of the materials, or a combination thereof. In an illustrative example, a threshold such as 40% difference in CTEs may be considered matched, while a 200% difference in CTEs may be considered unmatched. Any suitable threshold, depending on any suitable constraints, may be used to determine matching of CTEs. In some embodiments, CTEs need not be matched, or otherwise impact material selection.

Under some operating conditions, a sealing ring assembly deflects outward under pressure forces to conform to the cylinder bore. When this happens, the highest tensile stresses arise at the ID of the sealing ring assembly, and the highest compressive stresses occur at the radially outer surface (e.g., defining an outer diameter (OD)) of the sealing ring assembly. The tensile stresses due to bending and the compressive stresses due to the braze joint at the ID of the seal material are additive. The resulting sum of the stresses at the ID is lower than in an equivalently sized ceramic-only ring (i.e., without a reinforcement layer), for example, as described above and illustrated in FIGS. 15 and 16.

Additionally, even without the compressive preload effect, if one considers the sealing ring as a beam in bending during its expansion, it is the extreme fibers of the ring (e.g., the "fibers" at the inner and outer radii (radial surfaces)) that typically experience the greatest stresses and thus carry the greatest load. For example, FIG. 3B above shows a typical stress distribution of a ring in pure bending, illustrating the peak stresses 303 and 304 at the radial outer 325 and inner 310 surfaces (e.g., the outer and inner "fibers" of the beam) of the sealing ring 350. Even when a ring experiences a more complex state of stress, such as an azimuthal (hoop) stress, any bending load superimposed on the azimuthal load will tend to produce peak stresses at the outer and inner radius of the ring. Replacing, or adding to, the material at the ID of the ring (i.e., the surface that experiences the greatest tensile stresses in bending) with a material that has a higher modulus of elasticity, or tensile strength, or both, reduces the likelihood of failure (e.g., fracturing of the lower strength material, lower toughness material, brittle material, or a ceramic).

While tensile stress on the ID of a sealing ring or ring segment is a primary concern, other stresses may occur and impact material selection, reinforcement, or both. For example, a sealing ring assembly axially crossing breathing ports and bridges may present stresses that are addressed by inclusion of a suitable reinforcement. In some embodiments, a reinforcement need not be included at, or only at, an ID of a sealing ring. For example, a reinforcement may be included and affixed to an axial face of a sealing ring of a relatively low strength material, thereby reducing the likelihood of a failure. A reinforcement may be included at any suitable location of a sealing ring, and form any suitable interface with the sealing ring, in accordance with the present disclosure.

When the overall ring structure includes a composite of two materials, the bending strength and stiffness may be greater than an equivalently sized section of a single-material (e.g., the brittle or low tensile strength material only) sealing ring or ring segment thereof. This may be especially beneficial when, for example, the sealing ring assembly translates (e.g., in the axial direction) over open ports where the ring may be supporting a load across the open span between port bridges (i.e., the solid material between ports). In another example, this may be beneficial when the sealing ring assembly translates over valved areas (opened or closed).

In some embodiments, the dimensions (e.g., thickness), composition, or both, of the metal layer are selected to provide a desired stiffness of the composite structure, a desired pre-compression of the sealing ring, or both. In some embodiments, for example, a single split ring (i.e., a sealing ring having one ring segment) benefits from the addition of a brazed metal layer onto the radially inner surface.

The present disclosure directed to reinforcements is applicable when, for example, a sealing ring is made from a material such as a ceramic that may have a low fracture toughness or a polymer which may be tough, but have a low tensile strength. For example, such materials may be used in circumstances where the sealing ring assembly is operated without traditional oil lubrication (e.g., is configured to wear against a cylinder bore via direct contact).

In an illustrative example, a sealing ring assembly may include at least one ceramic ring or ring segment, and at least one reinforcing layer brazed or otherwise affixed to the at least one ceramic ring or ring segment. The reinforcing layer provides a compressive preloading onto the at least one ceramic ring or ring segment. The at least one ceramic ring may be created from graphite, for example.

In some embodiments, a composite structure is created by embedding one or more wires through, or near to, the radial center of a ring segment. In some such embodiments, the wire is affixed to the ring segment (e.g., by attaching to an end cap at each end of the ring segment arc). A composite structure may include a sealing ring, or ring segment thereof, and a metal layer, a wire, or both.

In some embodiments, a wire reinforcement is attached to the end caps by threading (e.g., engaging corresponding male and female threads), crimping, brazing, any suitable mechanical method, or any combination thereof. In some embodiments, a wire reinforcement is affixed to a sealing ring, or ring segment thereof, by brazing the wire to the ceramic along its length (e.g., in the azimuthal direction). For example, a wire may be affixed to both front and rear sealing rings of a twin-ring style sealing ring assembly, to a sealing ring having a single ring segment, to a sealing ring having a greater number of ring segments (i.e., more than two), to any other suitable sealing ring architecture, or any suitable combination thereof.

Figure 17:
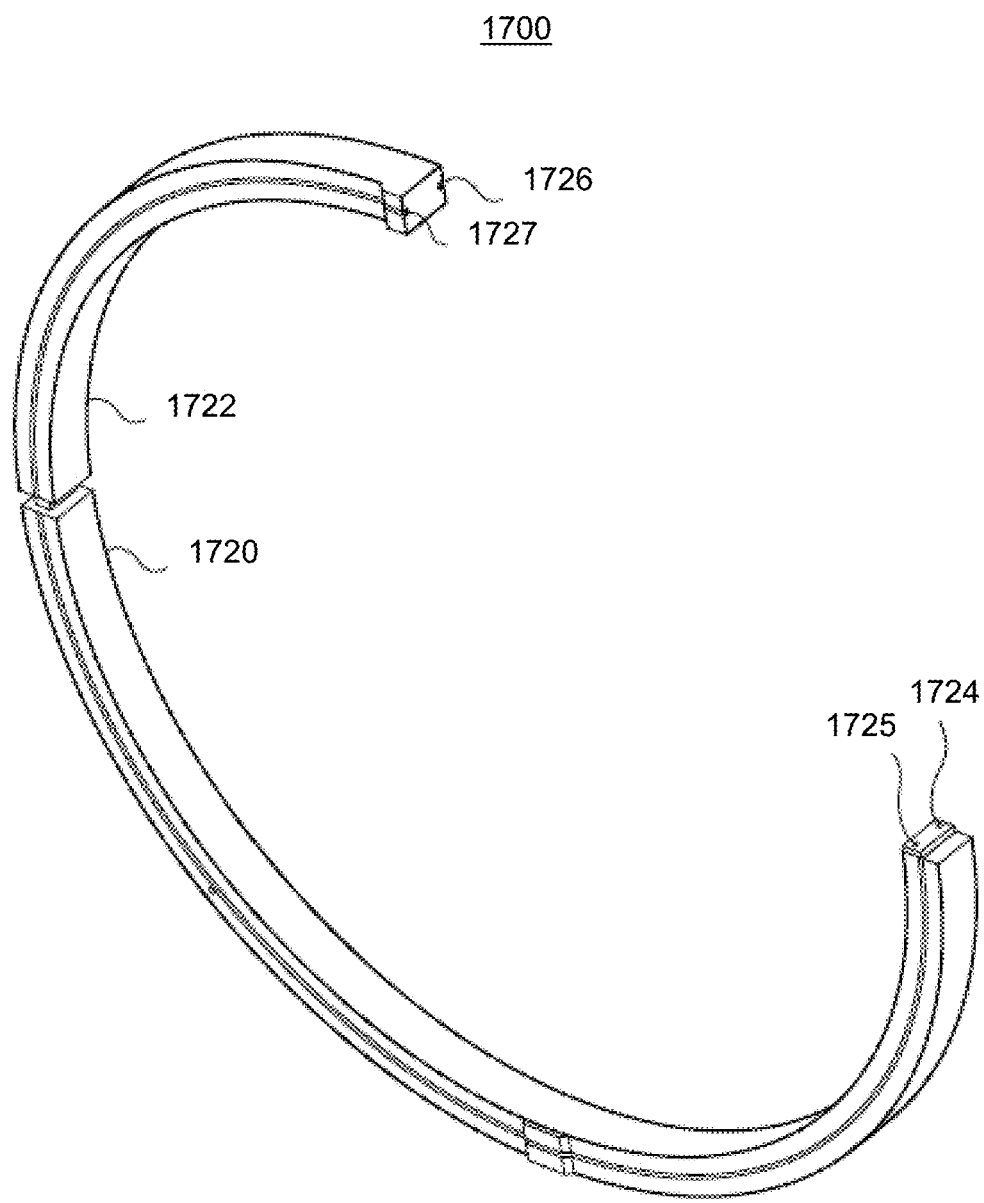
FIG. 17 shows a cross-sectional perspective view of a portion of an illustrative sealing ring assembly, with ring segments with wire reinforcement, in accordance with some embodiments of the present disclosure.

FIG. 17 shows a cross-sectional perspective view of portion 1700 of an illustrative sealing ring assembly, with ceramic ring segments 1720 and 1722, having wire reinforcements, in accordance with some embodiments of the present disclosure. Wires 1724 and 1725 are in tension and engaged with ring segment 1720, placing ring segment 1720 in compression. Wires 1726 and 1727 are in tension and engaged with ring segment 1722, placing ring segment 1722 in compression. Note that portion 1700 is a sealing ring assembly, minus a roughly 90 degrees portion for purposes of clarity.

Figure 18:
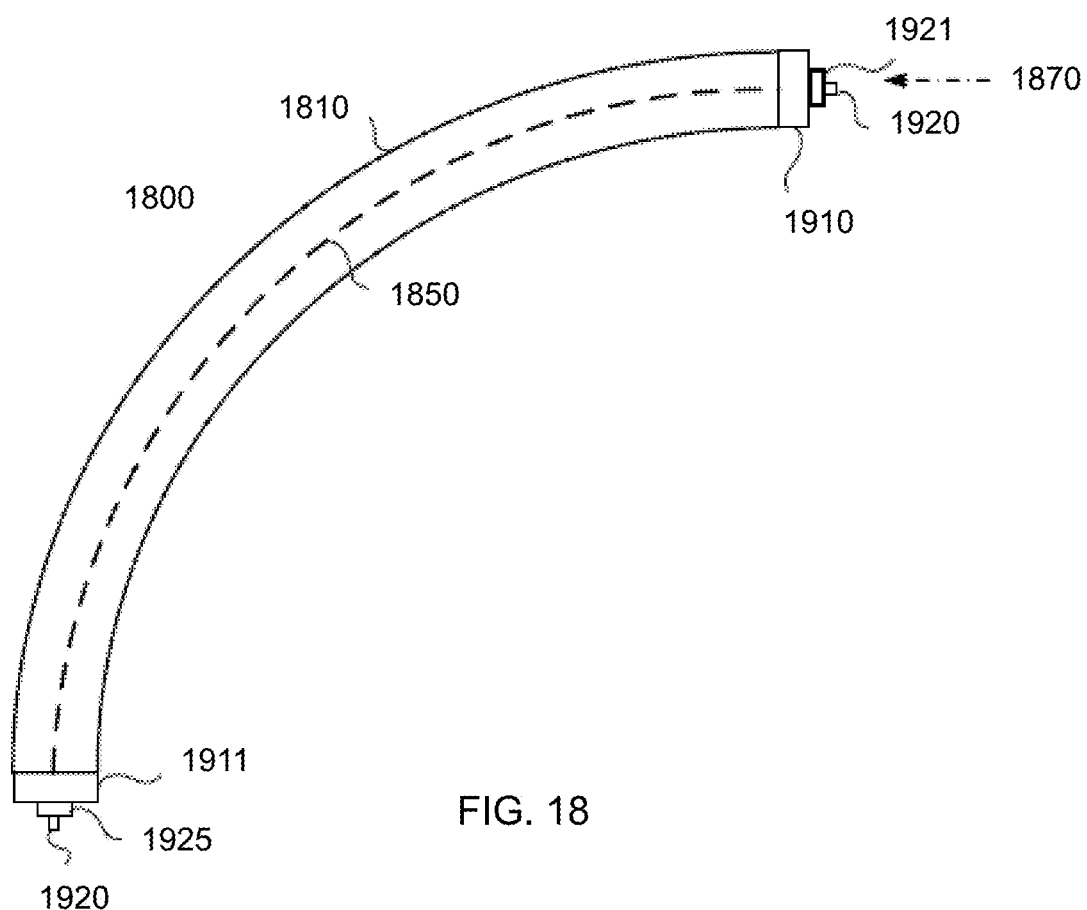
FIG. 18 shows a side view of a portion of an illustrative sealing ring assembly, having a ring segment with wire reinforcement, in accordance with some embodiments of the present disclosure.

FIG. 18 shows a side view of a portion 1800 of an illustrative sealing ring assembly, having ring segment 1810 with wire 1920, in accordance with some embodiments of the present disclosure. Ring segment 1810 may be one ring segment of a plurality of ring segments that collectively form a sealing ring or sealing ring assembly. Ring segment 1810 includes a passage 1850, along which wire 1920 is arranged. The ends of wire 1920 extends azimuthally (e.g., along axis 1870) past end caps 1910 and 1911. End caps 1910 and 1911 may include a material having any suitable properties such as, for example, a metal, a ceramic, a plastic, or any combination thereof. Wire 1920 is held in tension by fasteners (e.g., tensioning terminations 1921 and 1925), which may include threaded-on fasteners (e.g., nuts), crimped connections, any other suitable securement, or any combination thereof, that causes wire 1920 to be in tension and ring segment 1810 to be in compression.

Figure 19:
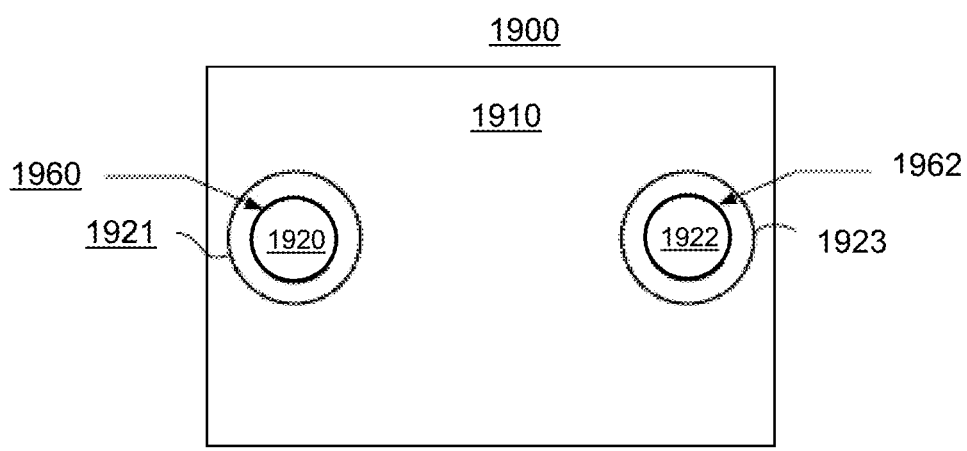
FIG. 19 shows an end view of the illustrative portion of FIG. 18, with ring segments with wire reinforcement, in accordance with some embodiments of the present disclosure.

FIG. 19 shows an end view 1900 of illustrative portion 1800 of FIG. 18, in accordance with some embodiments of the present disclosure. End cap 1910 includes two holes, each accommodating one of wires 1920 and 1922, but not tensioning terminations 1921 and 1923 (e.g., the diameter of the holes is greater than the diameter of wires 1920 and 1922 but less than the width of terminations 1921 or 1923). Tensioning terminations 1921 and 1923 are affixed to ends of respective wires 1920 and 1922, thus placing wires 1920 and 1922 in tension. Note that there are similar tensioning terminations and an endcap at the other (i.e., not shown in FIG. 19) end of wires 1920 and 1922. The tension force is reacted against end cap 1910, and opposite end cap 1911, thus placing ring segment 1810 in compression (e.g., as a preload). As shown in FIG. 19, wires 1920 and 1922 are affixed to respective tensioning terminations 1921 and 1923 at respective interfaces 1960 and 1962, which may include threaded interfaces, crimped interfaces, affixed interfaces, or any other suitable interface providing securement.

In some embodiments, a threaded wire is placed in tension against end caps, which are arranged at ends of a ring segment, using nuts by applying a specified torque to the nuts, thus drawing the wire into tension. This tension is reacted against the end caps, which results in compression of the ring segment (e.g., which may be made of polymer, graphite, or other ceramic). Accordingly, the ring segment is in compression in its neutral state. This compressive "preloading" of the ring segment counteracts the tension induced during expansion (e.g., during operation of a piston-cylinder device). This lowered state of tensile stress during operation increases the survivability of the ceramic and allows for a higher ultimate wear limit of the ceramic. In some embodiments, a ring segment may be in compression during a portion of a stroke of a piston-cylinder device, all of a stroke of a piston-cylinder device, when not in operation, or any suitable combination thereof. For example, a reinforcement may apply a preload on the ring segment (e.g., putting the ring segment in compression), even when not operating. In a further example, a preload need not be applied, and the reinforcement need not be in tension until pressure forces are applied (e.g., during operation).

In some embodiments, the present disclosure is directed to a metal wire reinforcement useful, for example, when a sealing ring is made from a material, such as graphite or other ceramic, that is very strong in compression but weak in tension. For example, such materials may be used in circumstances where the sealing ring assembly is operated without traditional oil lubrication (e.g., is configured to wear against a cylinder bore).

In an illustrative example, a sealing ring assembly may include at least one ring or ring segment, and at least one metallic wire extending through or on at least a portion of the at least one ceramic ring or ring segment. The metallic wire is tensed to provide a compressive preloading onto the at least one ceramic ring or ring segment. Further, the sealing ring assembly may include at least one end cap attached to an end of the at least one ring segment and to an end of the at least one metallic wire.

Figure 20:
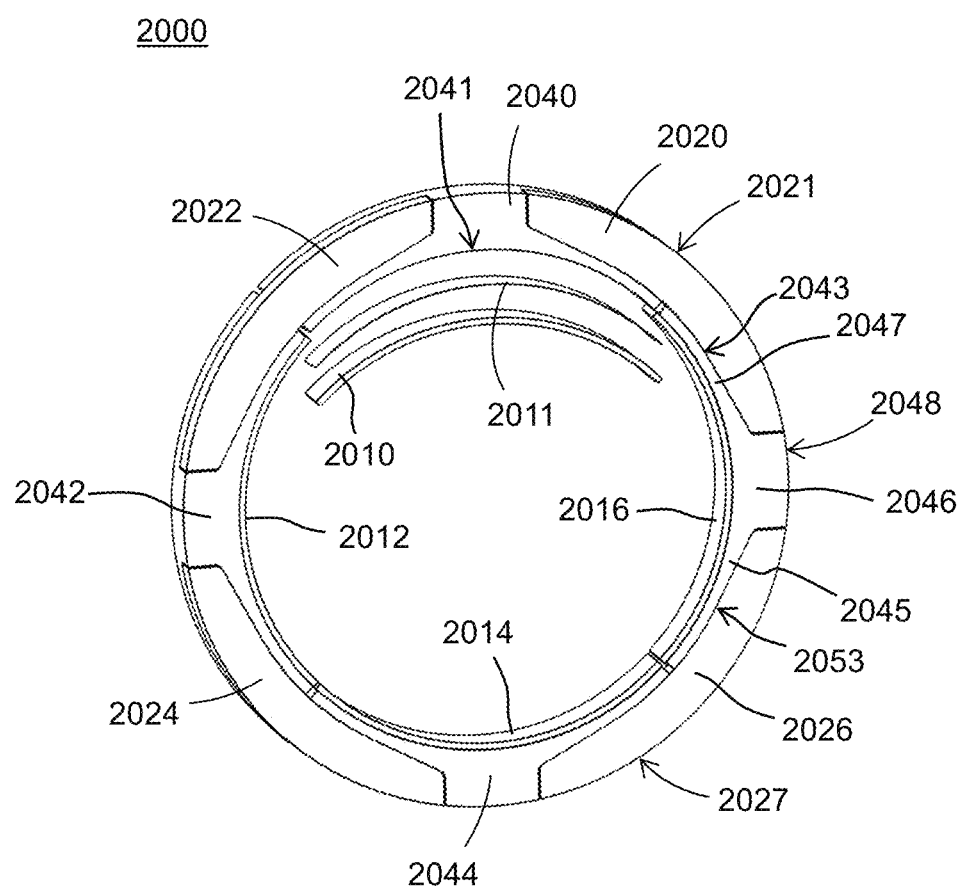
FIG. 20 shows a perspective, partially exploded, view of an illustrative sealing ring assembly, with reinforcements, in accordance with some embodiments of the present disclosure.

FIG. 20 shows another embodiment of a sealing ring assembly 2000 according to embodiments of the present disclosure. Sealing ring assembly 2000 includes ring segments 2020, 2022, 2024, and 2026, as well as gap cover elements 2040, 2042, 2044, and 2046. Sealing ring assembly includes four ring segments and four gap cover elements. However, any suitable number of ring segments and corresponding gap cover elements may be used in accordance with the present disclosure.

Ring segments wear at the outer radius due to repetitive contact with a cylinder wall, as described above and illustrated in FIGS. 1 and 2. Gap cover elements may also wear at the outer radius due to repetitive contact with a cylinder wall. As the ring segments wear, they become relatively thinner and gaps may form between the ring segments. The gap cover elements are configured to fill the gaps by displacing radially as the ring segments wear to remain congruent to the ring segments both at the radial surface and the axial surfaces, thus preventing leakage through the ring assembly. In some embodiments, a gap cover element may engage with a ring segment at an angled surface that allows the gap cover element to remain engaged with adjacent ring segments as the ring segments wear. As the ring segment wears, the gap cover element also wears, and the gap cover element translates radially outward so that the azimuthal length of the outer radial surface of the gap cover element increases (with wear). Embodiments of gap cover elements are described in commonly assigned U.S. patent application Ser. No. 16/100,017 titled "PISTON SEALING RING ASSEMBLY HAVING A GAP COVER ELEMENT," filed on Aug. 9, 2018, which is hereby incorporated by reference herein in its entirety.

For example, and with further reference to FIG. 20, gap cover element 2046 may include angled surfaces 2043 and 2053 configured to engage with adjacent ring segments 2020 and 2026 respectively to create and maintain a seal (i.e., configured to restrict gas leakage between ring segments). A gap cover element may also include a curved interface, where it is disposed between adjacent ring segments, to contact a cylinder wall (e.g., the curved portion 2048 of gap cover element 2046 that resembles a ring segment). As ring segments 2020 and 2026 wear, outer surfaces 2021 and 2027 recede radially, and curved portion 2048 of gap cover element 2046 may wear similarly while remaining congruent to the outer surfaces 2021 and 2027 of the ring segments 2020 and 2026.

During high pressure portions of a power production cycle or air compressor cycle, high gas pressure acts on the radially inner surfaces of gap cover elements 2040, 2042, 2044, and 2046. This high gas pressure forces the angled sides of each gap cover element (e.g., angled surfaces 2043 and 2053 of gap cover element 2046) against the corresponding angled sides of the corresponding ring segments 2020 and 2026, creating a seal to prevent radial gas leakage through the splits in the ring. Also, when acted on by high gas pressure at the radially inward surface, the radially outward surface of the gap cover elements (e.g., curved portion 2048) presses against the inner surface of a cylinder (e.g., the bore), forming a seal to prevent axial leakage through the split, or blow-by, past the sealing ring assembly.

Due to size constraints inherent in piston ring grooves, the angled surfaces of the gap cover elements may create thin extensions (i.e., wings) where they taper radially along the inner diameter of the ring segment. For example, angled surfaces 2043 and 2053 form wings 2045 and 2047 that extend under the adjacent ring segments 2026 and 2020, respectively. These thin extensions may be prone to failure due to the repetitive high-pressure forces incident on their inner radial surfaces. As such, strengthening members may be attached along the inner radius of the gap cover elements to reinforce the relatively thin wings (e.g., wings 2045 and 2047). For example, sealing ring assembly 2000 includes reinforcements 2010, 2012, 2014, and 2016, which are attached to the inner radius of each gap cover element 2040, 2042, 2044, and 2046, respectively. The reinforcements may be attached by any suitable method that allows the reinforcement to strengthen the gap cover element and to remain attached to the gap cover element when exposed to high pressure. In some embodiments, the reinforcements stay attached even when under no pressure load; that is, they do not rely on a radial pressure to remain engaged to the gap cover elements. In embodiments, the reinforcements may be bonded or brazed to the gap cover elements.

For purposes of illustration, reinforcement 2010 is shown separated (exploded) from sealing ring assembly 2000 in FIG. 20. Reinforcement 2010 may be attached along a portion or, as shown, along the entirety of inner surface 2041 of gap cover element 2040. A bonding layer 2011 may be interposed between reinforcement 2010 and gap cover element 2040 (e.g., reinforcement 2010 and gap cover element 2040 are arranged opposite each other). The bonding layer may be, for example, a layer of adhesive or an adhesive preform or a braze preform (e.g., a metal foil).

Figure 21:
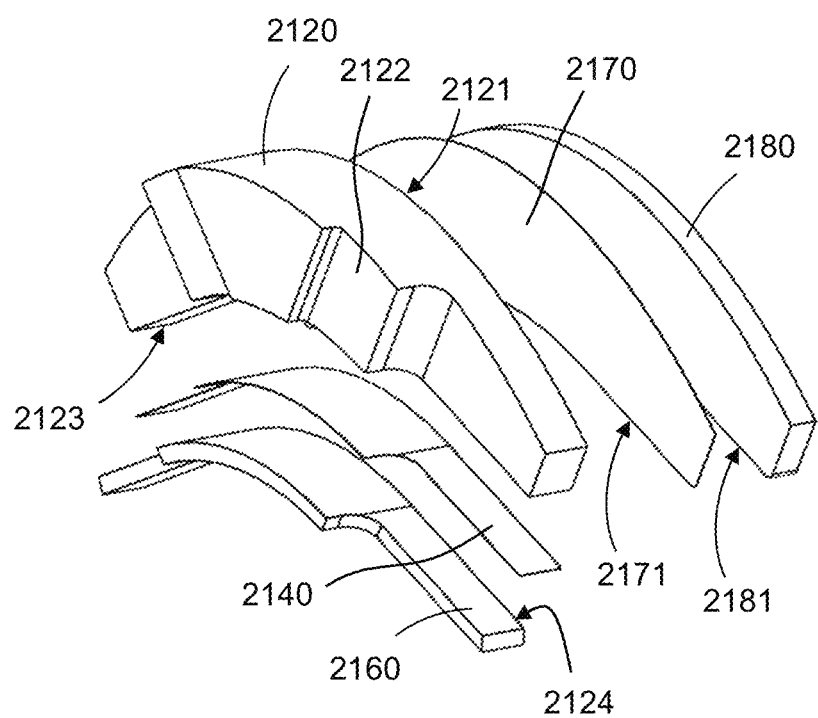
FIG. 21 shows a perspective exploded view of an illustrative sealing ring segment, with a reinforcement, in accordance with some embodiments of the present disclosure.

FIG. 21 shows an exploded view of ring segment assembly 2100 having a reinforcement to add strength and stiffness according to embodiments of the present disclosure. Ring segment assembly 2100 may include front ring segment 2120, reinforcement 2160 attached at inner radial surface 2123 (e.g., also referred to as a radially inner surface) of front ring segment 2120, and rear ring segment 2180 attached to the back surface 2121 of front ring segment 2120. For clarity, ring segment assembly 2100 is shown alone without the entire ring assembly, which may include other ring segments, and gap cover elements, for example.

As shown in FIG. 21, front ring segment 2120 has various cutouts and geometric features (e.g., recess 2122) for engaging with other components of the ring assembly (not shown). Reinforcement 2160 may have a shape that matches or approximates the geometry of the inner radial surface of front ring segment 2120. Likewise, bonding layer 2140 may match or approximate the same geometry as shown. Bonding layer 2140 may be a braze preform or adhesive preform that is cut in substantially the same shape as reinforcement 2160. Rear ring segment 2180 may be attached to the back surface 2121 of front ring segment 2120 by bonding layer 2170, which also may be a braze or adhesive that is cut in substantially the same shape as back surface 2121 of front ring segment 2120.

Ring segment assembly 2100 may be further strengthened by rear ring segment 2180 being attached to the side 2124 of reinforcement 2160. Thus, if inner radius 2181 of the rear ring segment 2180 and the inner radius 2171 of bonding layer 2170 extend radially inward beyond front ring segment 2120 at least by the thickness of reinforcement 2160 plus bonding layer 2140, then the rear ring segment 2180 can attach to reinforcement 2160 during the bonding process via bonding layer 2170. Therefore, rear ring segment 2180 can be supported by the additional stiffness afforded by reinforcement 2160, resulting in a stronger ring segment assembly 2100.

The various components that make up the ring assembly may have slight misalignment due to manufacturing tolerances or shifting during the bonding or brazing process excess material and misaligned joints. As such, a finish-machining process may be conducted after assembly to achieve desired seal tolerances.

In embodiments, as shown in FIGS. 20 and 21, gap cover elements (2040, 2042, 2044, 2046) and ring segments (2020, 2022, 2024, 2026, 2120, and 2180) may be made of a polymeric material (e.g., PTFE, Nylon, PEEK, PTFE/Silicone), a ceramic (e.g., graphite), or a graphite or ceramic composite (e.g., SiC/graphite), or any combination thereof. In some embodiments the seal is made of a self-lubricating material and is suitable for operating without traditional oil lubrication and configured to wear against a cylinder bore. As shown in FIGS. 20 and 21, reinforcements (2010, 2012, 2014, 2016, and 2160) may be made of, for example, a metal such as steel, molybdenum, or alloys thereof, other metal alloys, or a ceramic material. In some embodiments, the reinforcement may be made of a composite material such as a metal matrix composite (MMC), a ceramic matrix composite (CMC), or a fiber-reinforced plastic such as carbon fiber reinforced polymer (CFRP).

Figure 22:
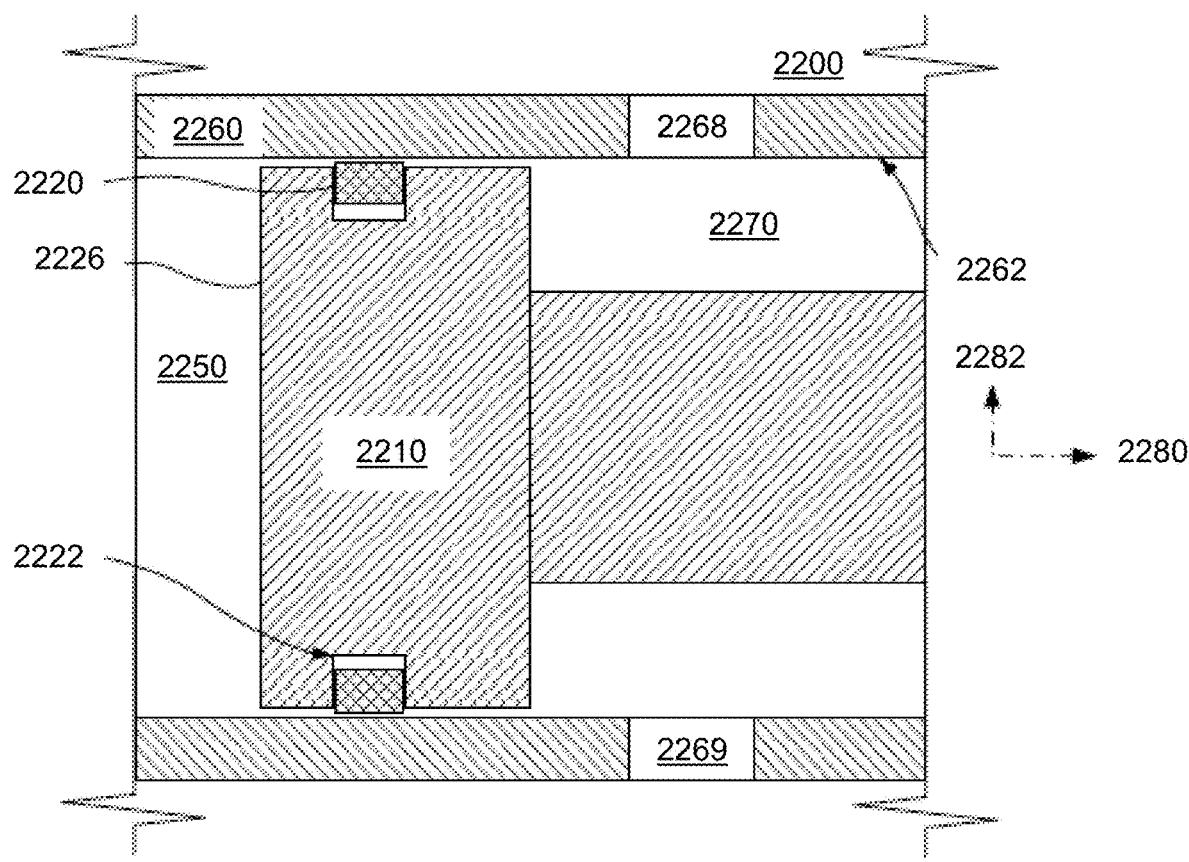
FIG. 22 shows a perspective view of an illustrative piston and cylinder assembly, in accordance with some embodiments of the present disclosure.

FIG. 22 shows a sectional view of illustrative piston and cylinder assembly 2200, in accordance with some embodiments of the present disclosure. Cylinder 2260 may include bore 2262, which is the inner cylindrical surface in which piston assembly 2210 travels. Piston assembly 2210 may include piston 2226, which includes a sealing ring groove 2222, in which sealing ring assembly 2220 is configured to ride. As piston assembly 2210 translates along the axial direction shown by axis 2280 (e.g., during an engine cycle), in cylinder 2260, the gas pressure in high-pressure region 2250 may change (high-pressure region 2250 may be closed with a cylinder head or an opposing piston). For example, as piston assembly 2210 moves opposite the direction of axis 2280 (i.e., to the left in FIG. 22), the pressure in high-pressure region 2250 may increase. Low-pressure region 2270, located to the rear of sealing ring assembly 2220, may be at a gas pressure below the pressure of high-pressure region 2250 for at least some, if not most, of a piston stroke or cycle of the piston and cylinder assembly. The pressure ranges in high-pressure region 2250 and low-pressure region 2270 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low-pressure region 2270 may interact flow-wise with intake or exhaust ducting that is in communication with ports 2268 or 2269, and be maintained relatively near to a pressure in the ducting. In an illustrative example, low-pressure region 2270 may open to intake breathing ports 2268 or 2269, and may be at a pressure near to or strongly affected by (e.g., on average) an intake pressure (e.g., a boost pressure). In a further illustrative example, low-pressure region 2270 may open to exhaust breathing ports 2268 or 2269 and may be at a pressure near to or strongly affected by (e.g., on average) an exhaust pressure. In accordance with the present disclosure, sealing ring assemblies may be used to seal high-pressure regions from low-pressure regions for at least part of a piston stroke or cycle of a piston and cylinder assembly. It will be understood that the "front" of sealing ring assembly 2220 refers to the face axially nearest high-pressure region 2250, and the "rear" of sealing ring assembly 2220 refers to the face axially nearest low-pressure region 2270.

It will be understood that unless otherwise specified, all pressures referred to herein are in absolute units (e.g., not gage or relative).

In some embodiments, low-pressure region 2270 may include, communicate gas pressure with, or otherwise be open to ports 2268 and 2269 for gas exchange. For example, ports 2268 and 2269 may be exhaust ports, intake ports, or both. Ports may be, but need not be, opened and closed using valves. For example, in some embodiments, ports 2268 and 2269 refer to openings coupled to a manifold or other flow plenum, without valves included (e.g., flow is control by covering and uncovering ports 2268 and 2269 by sealing ring assembly 2220). In a further example, in some embodiments, ports 2268 and 2269 refer to openings coupled to a manifold or other flow plenum, with valves included to control flow profiles and timing. The term "valve" may refer to any actuated flow controller or other actuated mechanism for selectively passing matter through an opening, including but not limited to: ball valves, plug valves, butterfly valves, choke valves, check valves, gate valves, leaf valves, piston valves, poppet valves, rotary valves, slide valves, solenoid valves, 2-way valves, or 3-way valves. Valves may be actuated by any means, including but not limited to mechanical, electrical, magnetic, camshaft-driven, hydraulic, or pneumatic means.

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low pressure are relative and depend on the conditions of the gas being sealed.

A sealing ring assembly may be used to seal a high pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 2220 may deposit material on bore 2262 of cylinder 2260 (e.g., include a self-lubricating material). Deposited material may lubricate the bore-to-sealing ring assembly interface between bore 2262 and sealing ring assembly 2220 (e.g., provide a dry lubricant). Accordingly, in some embodiments, piston and cylinder assembly 2200 may operate without oil for lubrication. In some embodiments, sealing ring assembly 2220 includes a metal layer, a metal wire, or both, or any other suitable reinforcement, and is configured to prevent contact between bore 2262 and the metal layer or the metal wire.

In some embodiments, piston 2226 may be an open-faced piston. For example, piston 2226 may include openings, cutouts, or other fluid paths from high-pressure region 2250 to ring groove 2222. Accordingly, in some embodiments employing an open-faced piston, the inner radial surfaces (e.g., referencing axis 2282 in the radial direction in FIG. 22) of sealing ring assembly 2220 may be exposed to gas pressure of high pressure region 2250.

Figure 23:
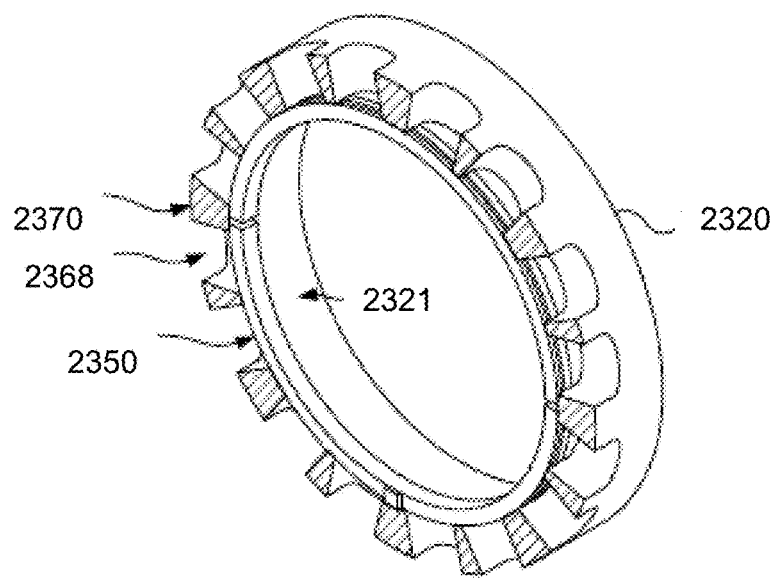
FIG. 23 shows a cross-sectional perspective view of an illustrative sealing ring assembly in the bore of a cylinder, in accordance with some embodiments of the present disclosure.

FIG. 23 shows a cross-sectional perspective view of illustrative sealing ring assembly 2350 in bore 2321 of cylinder 2320, in accordance with some embodiments of the present disclosure. Cylinder 2320 includes ports 2368, arranged in between port bridges 2370. Ports 2368 are openings in bore 2321, configured to allow gas exchange (e.g., engine breathing of intake, exhaust, or both). As sealing ring assembly 2350 axially passes over ports 2368 and port bridges 2370, it may experience uneven, or reduced, inward force from bore 2321. The composite structure of sealing ring assembly 2350 may reduce tensile stresses in a ring segment of sealing ring assembly 2350 when crossing ports 2368.

Figure 24:
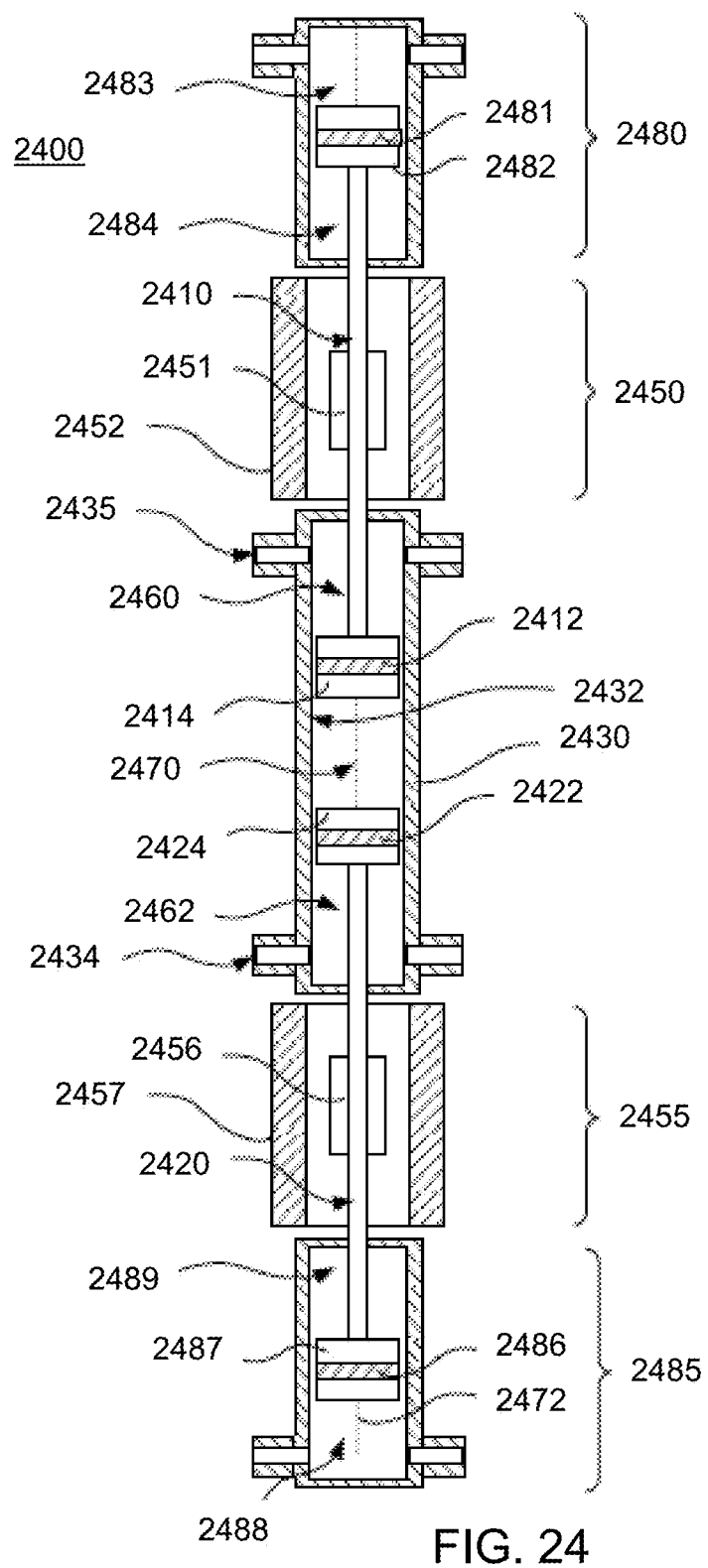
FIG. 24 shows a cross-sectional view of an illustrative device, including a sealing ring assembly, in accordance with some embodiments of the present disclosure.

FIG. 24 shows a cross-sectional view of illustrative device 2400, including two free-piston assemblies 2410 and 2420 that include respective sealing ring assemblies 2412 and 2422 in accordance with some embodiments of the present disclosure. In some embodiments, device 2400 may include linear electromagnetic machines 2450 and 2455 to convert between kinetic energy of respective free-piston assemblies 2410 and 2420 and electrical energy. In some embodiments, device 2400 may include gas regions 2460 and 2462, which may, for example, be at a relatively lower pressure than gas region 2470 (e.g., a high-pressure region) for at least some, if not most, of a cycle (e.g., an engine cycle, or an air compression cycle). For example, gas regions 2460 and 2462 (e.g., low-pressure regions) may be open to respective breathing ducting (e.g., an intake manifold, an intake system, an exhaust manifold, an exhaust system). To illustrate, breathing ports 2434 and 2435 are configured to provide reactants to, and remove exhaust from, bore 2432 of cylinder 2430. In a further example, gas regions 2460 and 2462 may be vented to atmosphere (e.g., be at about 1.01 bar absolute pressure). In some embodiments, device 2400 may include gas springs 2480 and 2485, which may be used to store and release energy during a cycle in the form of compressed gas (e.g., a driver section). For example, free-piston assemblies 2410 and 2420 may each include respective pistons 2482 and 2487, having grooves for respective sealing ring assemblies 2481 and 2486, to seal respective gas regions 2483 and 2488 (e.g., high-pressure regions) from respective gas regions 2484 and 2489 (e.g., low-pressure regions).

Cylinder 2430 may include bore 2432, centered about axis 2472. In some embodiments, free-piston assemblies 2410 and 2420 may translate along axis 2472, within bore 2432, allowing gas region 2470 to compress and expand. For example, gas region 2470 may be at relatively high pressure as compared to gas region 2460 for at least some of a stroke of free-piston assemblies 2410 and 2420 (e.g., which may translate along axis 2472 in opposed piston synchronization). Sealing ring assemblies 2412 and 2422 may seal gas region 2470 from respective gas regions 2460 and 2462 within bore 2432. In some embodiments, free-piston assemblies 2410 and 2420 may include respective pistons 2414 and 2424, and respective sealing ring assemblies 2412 and 2422, which may be arranged in respective corresponding grooves of pistons 2414 and 2424. It will be understood that gas regions 2460 and 2462, and gas region 2470, may change volume as free-piston assemblies 2410 and 2420 move or are otherwise positioned at different locations along axis 2472. The portions of respective sealing ring assemblies 2412 and 2422 nearest gas region 2470 are each termed the front, and the portion of sealing ring assemblies 2412 and 2422 nearest respective gas regions 2460 and 2462 are each termed the rear. Sealing ring assemblies 2412 and 2422 may each include a high-pressure boundary, which may each depend on a pressure in gas region 2470. For example, a high-pressure boundary of sealing ring assembly 2412 may be open to gas region 2470 (e.g., coupled by one or more orifices, or other opening), and have a corresponding pressure the same as (e.g., if gas from gas region 2470 is unthrottled in the sealing ring assembly), or less than (e.g., if gas from gas region 2470 is throttled in the sealing ring assembly), the pressure of gas region 2470. Sealing ring assemblies 2412 and 2422 may each include a low-pressure boundary, which may depend on a gas pressure in respective gas regions 2460 and 2462. For example, a low-pressure boundary of sealing ring assembly 2412 may be open to gas region 2460, and have a corresponding pressure about the same as the pressure of gas region 2460. In some embodiments, as sealing ring assemblies 2412 and 2422 axially pass over respective ports 2435 and 2434 (e.g., and corresponding port bridges, although not shown), they may experience uneven, or reduced, inward force from bore 2432. The composite structure of sealing ring assemblies 2412 and 2422 may reduce tensile stresses in a respective ring segment of each of sealing ring assemblies 2412 and 2422 when crossing ports 2435 and 2434.

In some embodiments, pistons 2414 and 2424 may each include one or more grooves into which one or more respective sealing ring assemblies may be arranged. For example, as shown in FIG. 24, pistons 2414 and 2424 may each include one groove, into which sealing ring assembly 2412 and sealing ring assembly 2422 may be installed, respectively. In a further example, although not shown in FIG. 24, piston 2414 may include two grooves, in which two respective sealing ring assemblies may be installed. In a further example, piston 2414 may include two grooves, the first sealing ring assembly 2412, and the second (not shown), arranged to the rear of sealing ring assembly 2412, but with its front nearer to gas region 2460, thereby sealing pressure in gas region 2460 to pressure between the two sealing ring assemblies (e.g., which may be less than pressure in gas region 2470). Accordingly, a sealing ring assembly may be used to seal any suitable high-pressure and low-pressure regions from each other.

In some embodiments, free-piston assemblies 2410 and 2420 may include respective magnet sections 2451 and 2456, which interact with respective stators 2452 and 2457 to form respective linear electromagnetic machines 2450 and 2455. For example, as free-piston assembly 2410 translates along axis 2472 (e.g., during a stroke of an engine cycle), magnet section 2451 may induce current in windings of stator 2452. Further, current may be supplied to respective phase windings of stator 2452 to generate an electromagnetic force on free-piston assembly 2410 (e.g., to effect motion of free-piston assembly 2410).

In some embodiments, pistons 2414 and 2424, sealing ring assemblies 2412 and 2422, and cylinder 2430 may be considered a piston and cylinder assembly. In some embodiments, device 2400 may be an engine, an air compressor, any other suitable device having a piston and cylinder assembly, or any combination thereof. In some embodiments, device 2400 need not include two free-piston assemblies. For example, cylinder 2430 could be closed (e.g., with a cylinder head), and free-piston assembly 2410 alone may translate along axis 2472.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors, free-piston heat engines, and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source such as waste heat or an external reaction such as combustion).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A piston assembly, comprising:
   a piston comprising a circumferential groove that extends around an outer surface of the piston; and
   a sealing ring assembly arranged in the circumferential groove, the sealing ring assembly comprising:
   at least one ring segment;
   a feature reinforcing the at least one ring segment; and
   a bonding layer attached to the feature and to the at least one ring segment, the bonding layer pre-fabricated based on a geometry of the feature.

2. The piston assembly of claim 1, wherein the feature comprises a reinforcement layer, and wherein:
   the bonding layer is attached to a radially inward surface of the at least one ring segment, and
   the reinforcement layer is attached to the bonding layer.

3. The piston assembly of claim 1, wherein the feature comprises a rear ring segment, and wherein:
   the bonding layer is attached to an axially rearward surface of the at least one ring segment, and
   the rear ring segment is attached to the bonding layer.

4. The piston assembly of claim 1, The sealing ring assembly of claim 1, wherein the bonding layer comprises a brazed layer.

5. The piston assembly of claim 1, wherein the bonding layer comprises an adhesive layer.

6. The piston assembly of claim 1, wherein the feature comprises at least one of a metal, a metal matrix composite, a ceramic matrix composite, or a carbon fiber-reinforced polymer.

7. The piston assembly of claim 1, wherein the at least one sealing ring segment comprises:
   a first ring segment, and wherein a first surface comprises a radially inner surface of the first ring segment, and
   a second ring segment configured to engage with and seal against the first ring segment.

8. The piston assembly of claim 1, wherein the at least one sealing ring segment comprises:
   a first ring segment; and
   a second ring segment, wherein the reinforcement layer is bonded to the first ring segment and to the second ring segment.

9. A sealing ring assembly comprising:
   at least one ring segment;
   a feature reinforcing the at least one ring segment; and a bonding layer attached to the feature and to the at least one ring segment, the bonding layer pre-fabricated based on a geometry of the feature.

10. The sealing ring assembly of claim 9, wherein the feature comprises a reinforcement layer, and wherein:
the bonding layer is attached to a radially inward surface of the at least one ring segment, and
the reinforcement layer is attached to the bonding layer.

11. The sealing ring assembly of claim 9, wherein the feature comprises a rear ring segment, and wherein:
the bonding layer is attached to an axially rearward surface of the at least one ring segment, and
the rear ring segment is attached to the bonding layer.

12. The sealing ring assembly of claim 9, wherein the bonding layer comprises a brazed layer.

13. The sealing ring assembly of claim 9, wherein the bonding layer comprises an adhesive layer.

14. The sealing ring assembly of claim 9, wherein the feature comprises at least one of a metal, a metal matrix composite, a ceramic matrix composite, or a carbon fiber-reinforced polymer.

15. The sealing ring assembly of claim 9, wherein the at least one sealing ring segment comprises:
a first ring segment, and wherein a first surface comprises a radially inner surface of the first ring segment, and
a second ring segment configured to engage with and seal against the first ring segment.

16. The sealing ring assembly of claim 9, wherein the at least one sealing ring segment comprises:
a first ring segment; and
a second ring segment, wherein the reinforcement layer is bonded to the first ring segment and to the second ring segment.

17. The sealing ring assembly of claim 9, wherein:
the reinforcement feature is a first reinforcement feature, and the bonding layer is a first bonding layer;
the at least one sealing ring segment comprises a first surface and a second surface; and
the sealing ring assembly further comprises:
the first bonding layer attached to the first surface;
the reinforcement feature attached to the first bonding layer;
a second bonding layer attached to the second surface, and
a second reinforcement feature attached to the second bonding layer.

18. The sealing ring assembly of claim 9, wherein:
the first bonding layer is arranged between the first reinforcement feature and the first surface of the at least one ring segment, wherein the first bonding layer comprises a first shape that at least approximates a first geometry of the first surface;
the second reinforcement feature is arranged along and opposite to the second surface; and
the second bonding layer arranged between the second reinforcement layer and the second surface, wherein the second bonding layer comprises a second shape that at least approximates a second geometry of the second surface.

19. The sealing ring assembly of claim 9, wherein the first surface comprises a radially inward surface of the at least one ring segment, and wherein the second surface comprises a surface adjacent to the radially inward surface that is arranged perpendicular to the radially inward surface of the at least one ring segment.

20. The sealing ring assembly of claim 9, further comprising at least one gap cover element configured to radially displace as the at least one ring segment wears.

21. The sealing ring assembly of claim 9, wherein the at least one ring segment comprises a self-lubricating material.

22. The sealing ring assembly of claim 21, wherein the self-lubricating material comprises a polymer.

23. The sealing ring assembly of claim 21, wherein the self-lubricating material comprises graphite.

24. The sealing ring assembly of claim 9, wherein the at least one sealing ring segment comprises:
a first ring segment, and wherein the first surface comprises a radially inner surface of the first ring segment, and
a second ring segment configured to engage with and seal against the first ring segment.

25. A sealing ring assembly formed by the method comprising:
arranging a bonding layer to a surface of at least one ring segment;
arranging a reinforcement feature to the bonding layer, wherein the reinforcement feature is arranged along and opposite to the surface;
heating the sealing ring assembly to a first temperature at least high enough to melt a bonding material of the bonding layer and higher than an operating temperature for the sealing ring assembly; and
cooling the sealing ring assembly to a second temperature lower than the first temperature so that the reinforcement feature is affixed to the at least one ring segment.

26. The sealing ring assembly of claim 25, wherein:
the bonding layer comprises a brazing layer; and
arranging the reinforcement feature comprises brazing the reinforcement feature to the surface of the at least one ring segment.

27. The sealing ring assembly of claim 25, wherein the at least one ring segment comprises a first ring segment and a second ring segment, wherein the bonding layer is a first bonding layer, the method further comprising arranging a second bonding layer between the first ring segment and the second ring segment to form the sealing ring assembly.

28. The sealing ring assembly of claim 25, wherein the reinforcement layer comprises a first coefficient of thermal expansion (CTE), wherein the at least one ring segment comprises a second CTE, and wherein the first CTE is greater than the second CTE.

29. The sealing ring assembly of claim 25, wherein the bonding material comprises a braze preform.

30. The sealing ring assembly of claim 25, wherein the operating temperature of the sealing ring assembly is between about 600 C to 800 C and the first temperature is between about 1000 C to 1200 C.

31. A method for forming a sealing ring assembly, the method comprising:
arranging a bonding layer to a surface of at least one ring segment;
arranging a reinforcement feature to the bonding layer, wherein the reinforcement feature is arranged along and opposite to the surface;
heating the sealing ring assembly to a first temperature at least high enough to melt a bonding material of the bonding layer and higher than an operating temperature for the sealing ring assembly; and
cooling the sealing ring assembly to a second temperature lower than the first temperature so that the reinforcement feature is affixed to the at least one ring segment.

* * * * *